(12) United States Patent
Shin

(10) Patent No.: US 12,105,196 B2
(45) Date of Patent: Oct. 1, 2024

(54) LiDAR DEVICE AND LiDAR SYSTEM INCLUDING THE SAME

(71) Applicant: SAMSUNG ELECTRONICS CO., LTD., Suwon-si (KR)

(72) Inventor: Changgyun Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 895 days.

(21) Appl. No.: 17/039,190

(22) Filed: Sep. 30, 2020

(65) Prior Publication Data

US 2021/0181342 A1 Jun. 17, 2021

(30) Foreign Application Priority Data

Dec. 12, 2019 (KR) .................. 10-2019-0165996
May 19, 2020 (KR) .................. 10-2020-0059967

(51) Int. Cl.
*G01S 17/32* (2020.01)
*G01S 7/481* (2006.01)
*G01S 17/48* (2006.01)

(52) U.S. Cl.
CPC .............. *G01S 17/32* (2013.01); *G01S 7/481* (2013.01); *G01S 17/48* (2013.01)

(58) Field of Classification Search
CPC .......... G01S 17/32; G01S 7/481; G01S 17/48; G01S 7/4816; G01S 7/4817; G01S 17/89; G01S 17/42; G01S 7/484; G01S 7/4911; G01S 17/894
USPC ...................................................... 356/4.01
See application file for complete search history.

(56) References Cited

U.S. PATENT DOCUMENTS

| 7,411,196 | B2 | 8/2008 | Kalayeh |
| 7,683,308 | B2 | 3/2010 | Charbon et al. |
| 7,719,029 | B2 | 5/2010 | Itzler |
| 8,040,586 | B2 | 10/2011 | Smith et al. |
| 8,767,190 | B2 | 7/2014 | Hall |
| 9,110,158 | B2 | 8/2015 | Habif |
| 9,632,216 | B2 | 4/2017 | Han et al. |

(Continued)

FOREIGN PATENT DOCUMENTS

| KR | 10-2017-0014404 A | 2/2017 |
| KR | 10-2019-0030027 A | 3/2019 |

(Continued)

OTHER PUBLICATIONS

"Phased array optics," Wikipedia, 2017, 2 pp. (Year: 2017).*
Communication dated May 11, 2021 issued by the European Patent Office in European Application No. 20210063.2.

*Primary Examiner* — Daniel L Murphy
(74) *Attorney, Agent, or Firm* — Sughrue Mion, PLLC

(57) ABSTRACT

Provided is a light detection and ranging (LiDAR) device including a light emitter configured to emit light, a first light detector, and a second light detector, wherein the first light detector includes a first optical antenna element having a first directivity with respect to a first direction, and a first light detection element configured to detect first reflected light received by the first optical antenna element, wherein the second light detector includes a second optical antenna element having a second directivity with respect to a second direction different from the first direction, and a second light detection element configured to detect second reflected light received by the second optical antenna element.

29 Claims, 21 Drawing Sheets

(56) References Cited

U.S. PATENT DOCUMENTS

| | | |
|---|---|---|
| 10,132,928 B2 | 11/2018 | Eldada et al. |
| 10,613,410 B2 | 4/2020 | Hosseini et al. |
| 10,884,106 B2 | 1/2021 | Lee |
| 2014/0232827 A1 | 8/2014 | Kumar et al. |
| 2015/0346340 A1 | 12/2015 | Yaacobi et al. |
| 2016/0209499 A1 | 7/2016 | Suzuki |
| 2017/0180658 A1 | 6/2017 | Choi et al. |
| 2017/0301716 A1 | 10/2017 | Irish et al. |
| 2018/0031681 A1 | 2/2018 | Yoon et al. |
| 2018/0348592 A1 | 12/2018 | Hosseini et al. |
| 2019/0079166 A1 | 3/2019 | Kim et al. |
| 2019/0187257 A1 | 6/2019 | Otsuka et al. |
| 2019/0243000 A1 | 8/2019 | Shim |
| 2019/0369244 A1 | 12/2019 | Asghari et al. |
| 2019/0391459 A1 | 12/2019 | Shin et al. |
| 2020/0049819 A1 | 2/2020 | Cho et al. |
| 2020/0103679 A1 | 4/2020 | Lee et al. |
| 2020/0174104 A1 | 6/2020 | Kim et al. |

FOREIGN PATENT DOCUMENTS

| | | |
|---|---|---|
| KR | 10-2020-0037639 A | 4/2020 |
| KR | 10-2020-0066947 A | 6/2020 |
| WO | 2018/128662 A2 | 7/2018 |

\* cited by examiner

LiDAR DEVICE AND LiDAR SYSTEM INCLUDING THE SAME

CROSS-REFERENCE TO RELATED APPLICATION

This application claims priority to Korean Patent Application No. 10-2019-0165996, filed on Dec. 12, 2019, and Korean Patent Application No. 10-2020-0059967, filed on May 19, 2020, in the Korean Intellectual Property Office, the disclosures of which are incorporated herein in their entireties by reference.

BACKGROUND

1. Field

Example embodiments of the present disclosure relate to a light detection and ranging (LIDAR) device and a LIDAR system.

2. Description of Related Art

LIDAR has been applied to various fields such as aerospace, geology, three-dimensional maps, automobiles, robots, drones, and the like.

LiDAR systems use time-of-flight measurement (TOF) of light as a basic operating principle. That is, light is transmitted toward an object and received by a sensor again, and a flight time is measured using a high speed electric circuit. The distance to the object may be calculated from the flight time. The depth image of the object may be processed from the distance calculated for each position of the object.

In such a method, due to the speed limit of light, there is a limit of image resolution that may be implemented within a given time frame.

SUMMARY

One or more example embodiments provide LiDAR devices having improved image resolution.

One or more example embodiment also provide LiDAR systems having improved image resolution.

However, embodiments are not limited to the above disclosure.

Additional aspects will be set forth in part in the description which follows and, in part, will be apparent from the description, or may be learned by practice of example embodiments.

According to an aspect of an example embodiment, there is provided a light detection and ranging (LiDAR) device including a light emitter configured to emit light, a first light detector, and a second light detector, wherein the first light detector includes a first optical antenna element having a first directivity with respect to a first direction, and a first light detection element configured to detect first reflected light received by the first optical antenna element, wherein the second light detector includes a second optical antenna element having a second directivity with respect to a second direction different from the first direction, and a second light detection element configured to detect second reflected light received by the second optical antenna element.

The light emitter may be configured to emit first light and second light to a first object and a second object, respectively, wherein the second light is emitted from the light emitter before an effective measurement time elapses from when the first light is emitted from the light emitter, wherein the first reflected light is light incident on the first optical antenna element among reflected pieces of light emitted as the first light that is reflected by the first object in the first direction, wherein the second reflected light is light incident on the second optical antenna element among reflected pieces of light emitted as the second light that is reflected by the second object in the second direction, wherein the effective measurement time is a time for determining at least one of a horizontal resolution, a vertical resolution, and a maximum measurement distance of the LiDAR device.

The first optical antenna element may be configured to block third reflected light incident on the first optical antenna element among reflected pieces of light emitted as the second light that is reflected by the second object in a direction that is different from the first direction from being transmitted to the first light detection element, and wherein the second optical antenna element is configured to block fourth reflected light incident on the second optical antenna element among reflected pieces of light emitted as the first light that is reflected by the first object in a direction that is different from the second direction from being transmitted to the second light detection element.

Each of the first optical antenna element and the second optical antenna element may include an optical phased array element.

The first directivity and the second directivity may be controlled based on an electrical signal or a thermal signal.

The light emitter may include a light source, and a beam steering device, wherein the light source is configured to emit light to the beam steering device, and wherein the beam steering device is configured to change a traveling direction of the light.

The light emitter may include a light source, and a driver configured to move the light source and a direction in which the light source emits light.

According to another aspect of an example embodiment, there is provided a light detection and ranging (LiDAR) device including a light emitter configured to emit light, a first light detector, a second light detector, and a processor configured to control the light emitter, the first light detector, and the second light detector, wherein the processor is further configured to control the first light detector to selectively detect first reflected light incident on the first light detector in a first direction, and control the second light detector to selectively detect second reflected light incident on the second light detector in a second direction that is different from the first direction.

The processor may be further configured to control the light emitter such that the light emitter emits first light and second light to a first object and a second object, respectively, and such that the second light is emitted from the light emitter before an effective measurement time elapses from when the first light is emitted from the light emitter, and wherein the effective measurement time is a time for determining at least one of a horizontal resolution, a vertical resolution, and a maximum measurement distance of the LiDAR device.

The first light detector may include a first optical antenna element and a first light detection element, wherein the first optical antenna element is configured to receive the first reflected light and transmit the first reflected light to the first light detection element, wherein the first light detection element is configured to detect the first reflected light, wherein the second light detector may include a second optical antenna element and a second light detection element, wherein the second optical antenna element is configured to receive the second reflected light and transmit the second reflected light to the second light detection element, and wherein the second light detection element is configured to detect the second reflected light.

The first optical antenna element may include a plurality of grating groups configured to split the first reflected light into pieces of light and receive the pieces of light formed by splitting the first reflected light, a plurality of phase control elements configured to independently control phases of the pieces of light formed by splitting the first reflected light, respectively, and a plurality of optical couplers configured to combine the phase-controlled pieces of light into one light, wherein the second optical antenna element may include a plurality of grating groups configured to split the second reflected light into pieces of light and receive the pieces of light formed by splitting the second reflected light, a plurality of phase control elements configured to independently control phases of the pieces of light formed by splitting the second reflected light, respectively, and a plurality of optical couplers configured to combine the phase-controlled pieces of light into one light.

The processor may be further configured to control the plurality of phase control elements of the first optical antenna element such that the pieces of light formed by splitting the first reflected light have same phases as each other, and control the plurality of phase control elements of the second optical antenna element such that the pieces of light formed by splitting the second reflected light have same phases as each other.

The processor may be further configured to control the first optical antenna element such that the first optical antenna element blocks third reflected light incident on the first optical antenna element among the reflected pieces of light emitted as the second light that is reflected by the second object from being transmitted to the first light detection element, and control the second optical antenna element such that the second optical antenna element blocks fourth reflected light incident on the second optical antenna element among the reflected pieces of light emitted as the first light that is reflected by the first object from being transmitted to the second light detection element.

The plurality of grating groups of the first optical antenna element may be configured to split the third reflected light into pieces of light and receive the pieces of light formed by splitting the third reflected light, wherein the plurality of grating groups of the second optical antenna element may be configured to split the fourth reflected light into pieces of light and receive the pieces of light formed by splitting the fourth reflected light, and wherein the processor may be further configured to control a plurality of phase control elements of the first optical antenna element such that the pieces of light formed by splitting the third reflected light have different phases, respectively, and control a plurality of phase control elements of the second optical antenna element such that the pieces of light formed by splitting the fourth reflected light have different phases, respectively.

The processor may be further configured to control the light emitter to emit third light on a third object when the effective measurement time elapses from when the first light is emitted, and control the first light detector such that the first light detector selectively detects third reflected light reflected by the third object.

After the first light is emitted, based on the first light detector not detecting the first reflected light before a predetermined emission time elapses, the processor may be further configured to control the light emitter to emit the second light when the predetermined emission time elapses from when the first light is emitted.

After the first light is emitted, based on the first light detector detecting the first reflected light before the predetermined emission time elapses, the processor may be further configured to control the light emitter to emit the second light before the predetermined emission time elapses from when the first light is emitted.

After the first light is emitted, based on the first light detector detecting the first reflected light before the predetermined emission time elapses, the processor may be further configured to control the light emitter to emit the second light when the first reflected light is detected.

The processor may be further configured to control the light emitter such that the light emitter emits third light on a third object between a first point in time at which the effective measurement time elapses from when the first light is emitted and a second point in time at which the second light is emitted, and the processor may be further configured to control the first light detector such that the first light detector selectively detects fifth reflected light reflected by the third object.

According to yet another aspect of an example embodiment, there is provided a light detection and ranging (LiDAR) system including a LiDAR device, and at least one processor configured to control the LiDAR device, wherein the LiDAR device includes a light emitter, a first light detector, a second light detector, and a first communication interface, wherein the first light detector includes a first optical antenna element having a first directivity with respect to a first direction, and a first light detection element configured to detect first reflected light received by the first optical antenna element, wherein the second light detector includes a second optical antenna element having a second directivity with respect to a second direction that is different from the first direction, and a second light detection element configured to detect second reflected light received by the second optical antenna element, and wherein the at least one processor is configured to control the light emitter, the first light detector, and the second light detector, and a second communication interface connected to the first communication interface.

The at least one processor may be configured to generate control signals to control the light emitter, the first light detector, and the second light detector, the second communication interface may be configured to transmit the control signals to the first communication interface, and the first communication interface may be configured to transmit the control signals to the light emitter, the first light detector, and the second light detector.

The first light detection element may be configured to generate a first detection signal for the first reflected light, and the second light detection element is configured to generate a second detection signal for the second reflected light, the first communication interface may be configured to transmit the first detection signal and the second detection signal to the second communication interface, and the second communication interface may be configured to transmit the first detection signal and the second detection signal to the processor.

The light emitter may be configured to emit first light and second light on a first object and a second object, respectively, the second light may be emitted from the light emitter before an effective measurement time elapses from when the first light is emitted from the light emitter, the first reflected light may be light incident on the first optical antenna element among reflected pieces of light emitted as the first light that is reflected by the first object in the first direction, the second reflected light may be light incident on the second optical antenna element among reflected pieces of light emitted as the second light that is reflected by the second object in the second direction, and the effective measurement time may be a time for determining at least one of a horizontal resolution, a vertical resolution, and a maximum measurement distance of the LiDAR device.

The first optical antenna element may be configured to block third reflected light incident on the first optical antenna element among reflected pieces of light emitted as the second light that is reflected by the second object in a direction that is different from the first direction from being transmitted to the first light detection element, and the second optical antenna element may be configured to block fourth reflected light incident on the second optical antenna element among reflected pieces of light emitted as the first light that is reflected by the first object in a direction that is different from the second direction from being provided to the second light detection element.

Each of the first optical antenna element and the second optical antenna element may include an optical phased array element.

The first directivity and the second directivity may be controlled by an electrical signal or a thermal signal.

The LiDAR system of claim 21, wherein the light emitter may include a light source, and a beam steering device, wherein the light source may be configured to emit to the beam steering device, and wherein the beam steering device may be configured to change a traveling direction of the light.

The light emitter may include a light source, and a driver configured to move the light source and a direction in which the light source emits light.

According to yet another aspect of an example embodiment, there is provided a light detection and ranging (LiDAR) device including a light emitter configured to emit light, a first light detector including a first optical antenna element and a first light detection element, the first light detector being configured to selectively detect first light incident on the first light detector in a first direction, and a second light detector including a second optical antenna element and a second light detection element, the second light detector being configured to selectively detect second light incident on the second light detector in a second direction that is different from the first direction, wherein the first optical antenna element and the second optical antenna element respectively includes an optical phased array.

The first optical antenna element may be configured to transmit the first light incident on the first light detector in the first direction to the first light detection element, and block light incident on the first light detector in a direction that is different from the first direction, and the second optical antenna element may be configured to transmit the second light incident on the second light detector in the second direction to the second light detection element and block light incident on the second light detector in a direction that is different from the second direction.

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
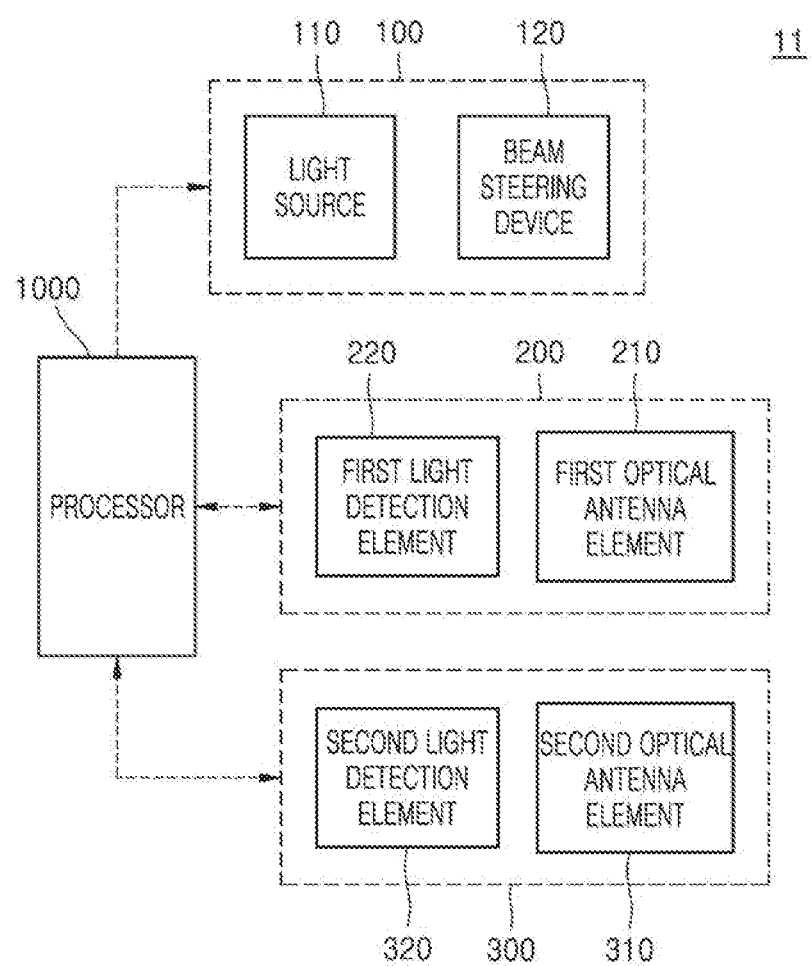
FIG. 1 is a block diagram of a LIDAR device according to example embodiments.

Reference will now be made in detail to example embodiments illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, what is described as "upper" or "on" may include not only directly over in contact but also over not in contact.

The terms of a singular form may include plural forms unless otherwise specified. Also, when a part "includes" a component, this means that, unless specifically stated otherwise, it may further include other components rather than excluding other components.

The terms "part", "module", and the like, which are described in the specification, mean a unit for processing at least one function or operation, and may be implemented in hardware or software, or in a combination of hardware and software.

Hereinafter, the "image resolution" may be at least one of a spatial resolution for a horizontal direction and/or a vertical direction and a temporal resolution that is an image update rate in unit time.

Figure 2:
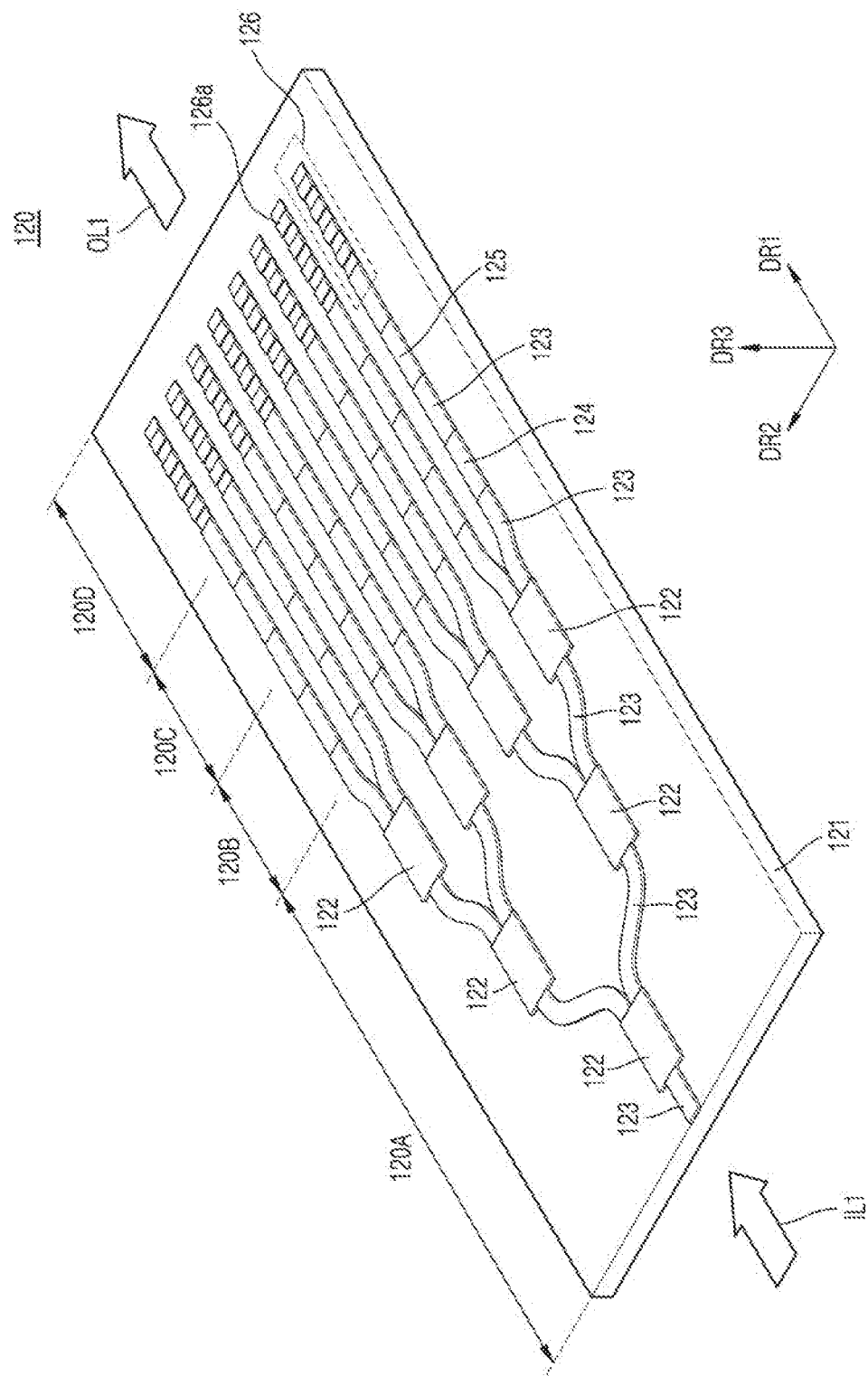
FIG. 2 is a perspective view of the beam steering device of FIG. 1.
Figure 3:
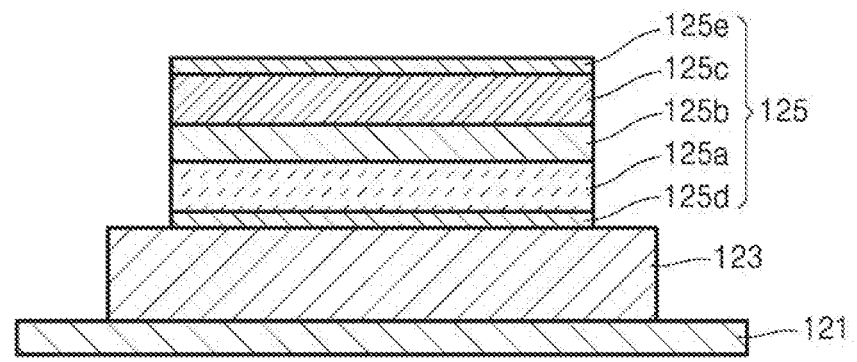
FIG. 3 is a diagram illustrating a first amplification region of FIG. 2.
Figure 3:
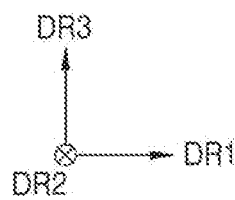
Figure 4:
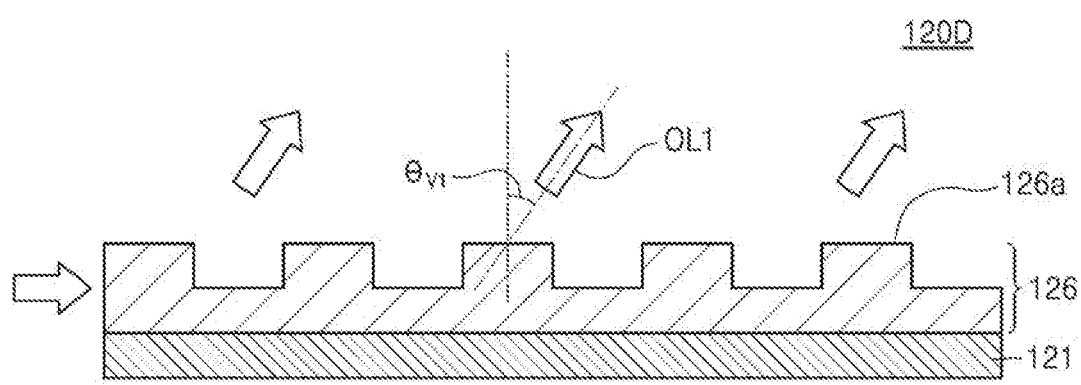
FIG. 4 is a cross-sectional view illustrating an emission region of FIG. 2.
Figure 4:
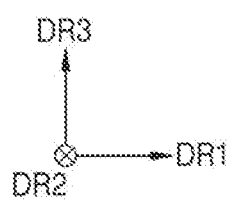
Figure 5:
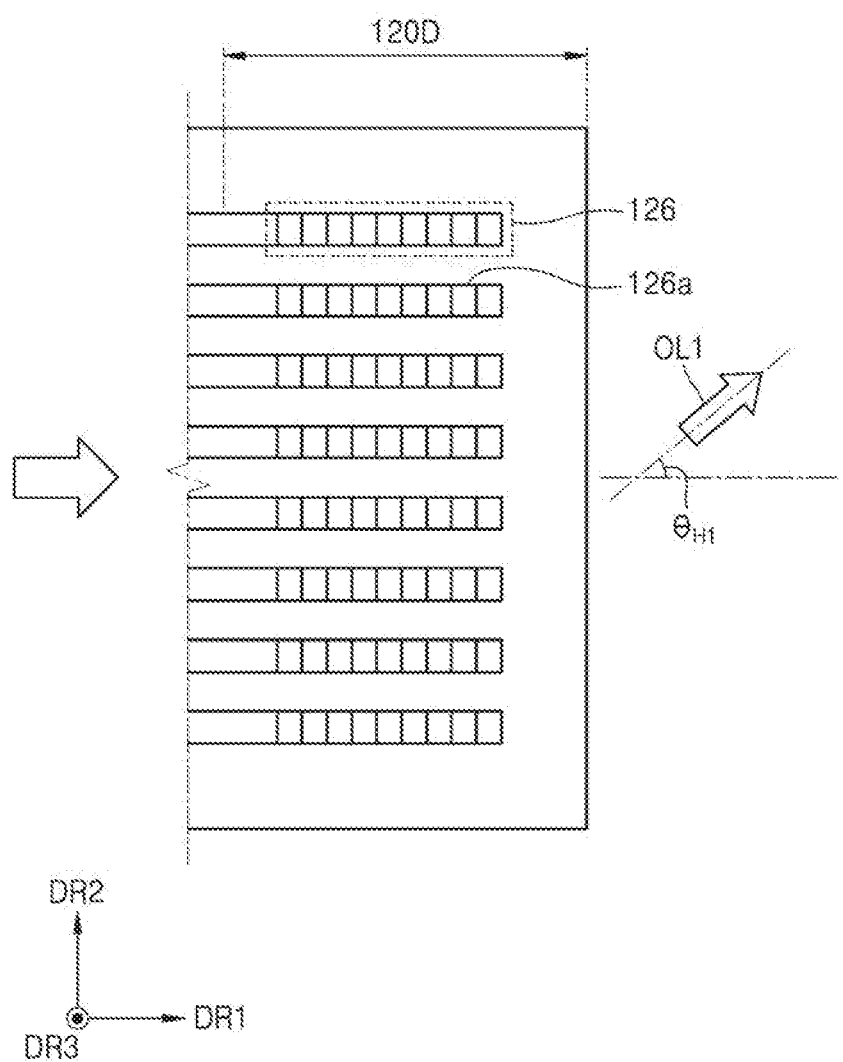
FIG. 5 is a plan view showing an emission region of FIG. 2.
Figure 6:
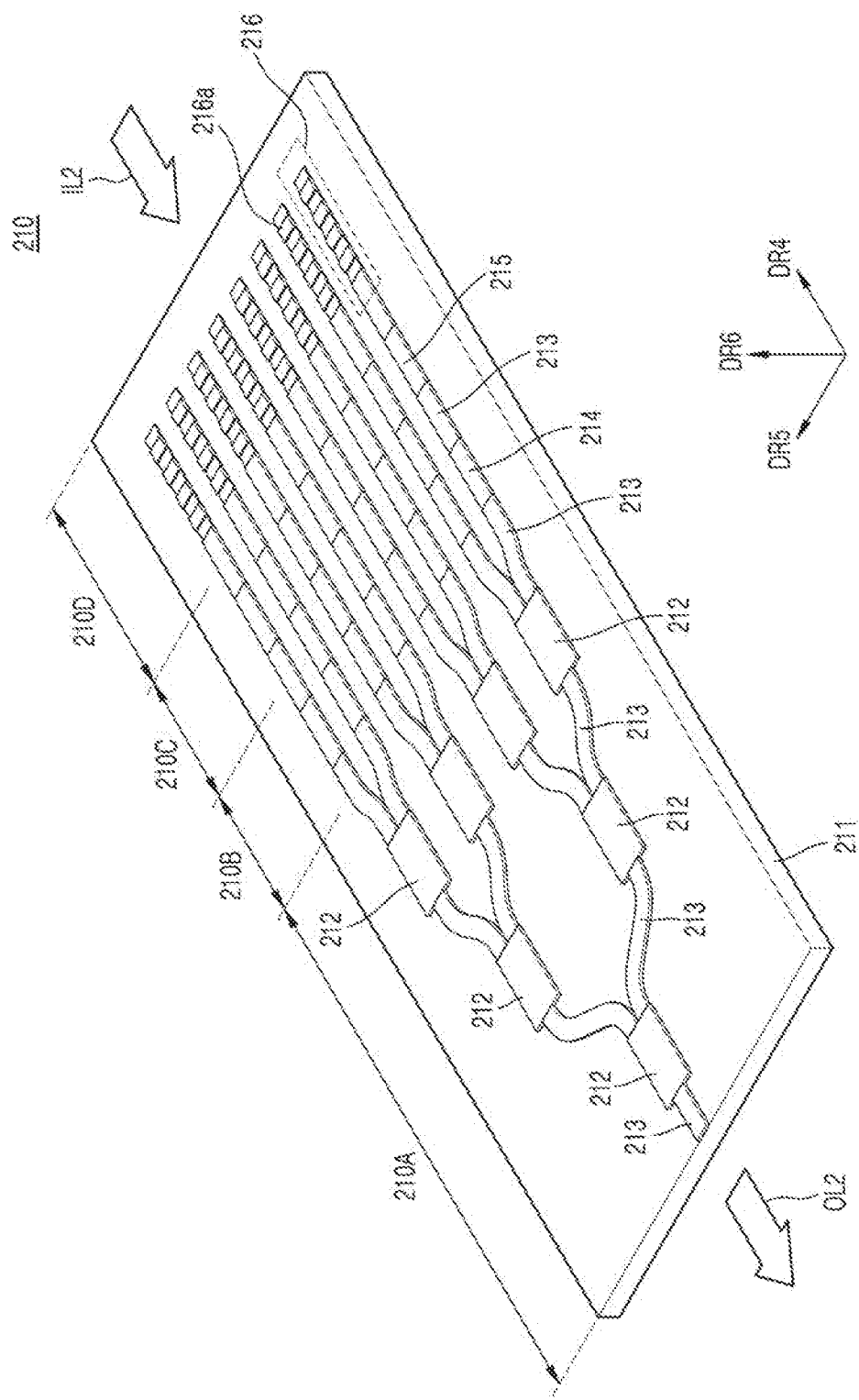
FIG. 6 is a perspective view of a first optical antenna element of FIG. 1.
Figure 7:
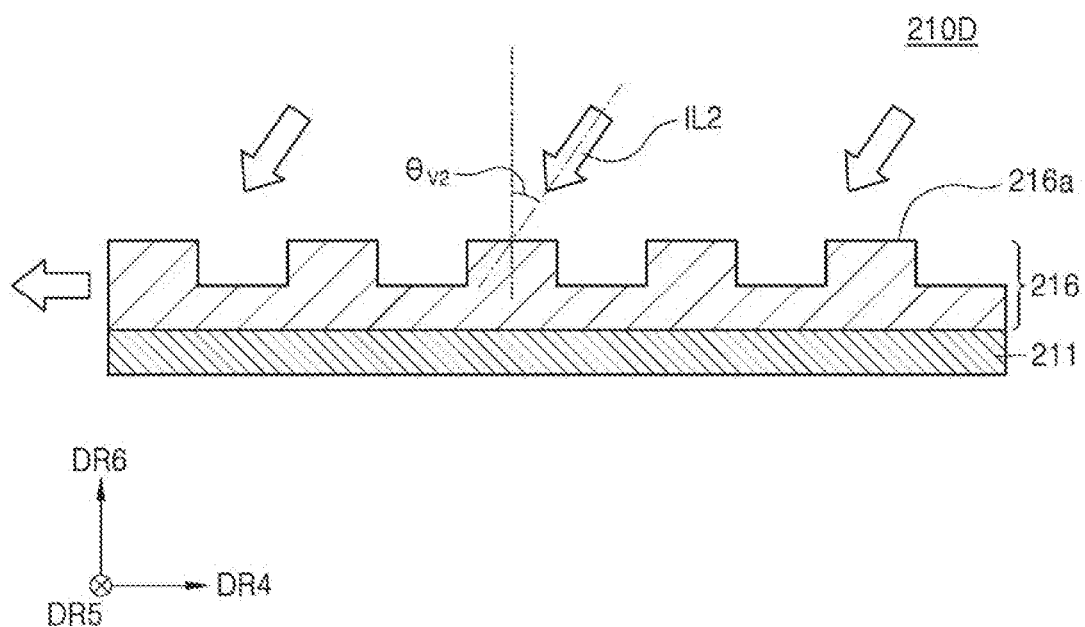
FIG. 7 is a cross-sectional view illustrating a first reception region of FIG. 6.
Figure 8:
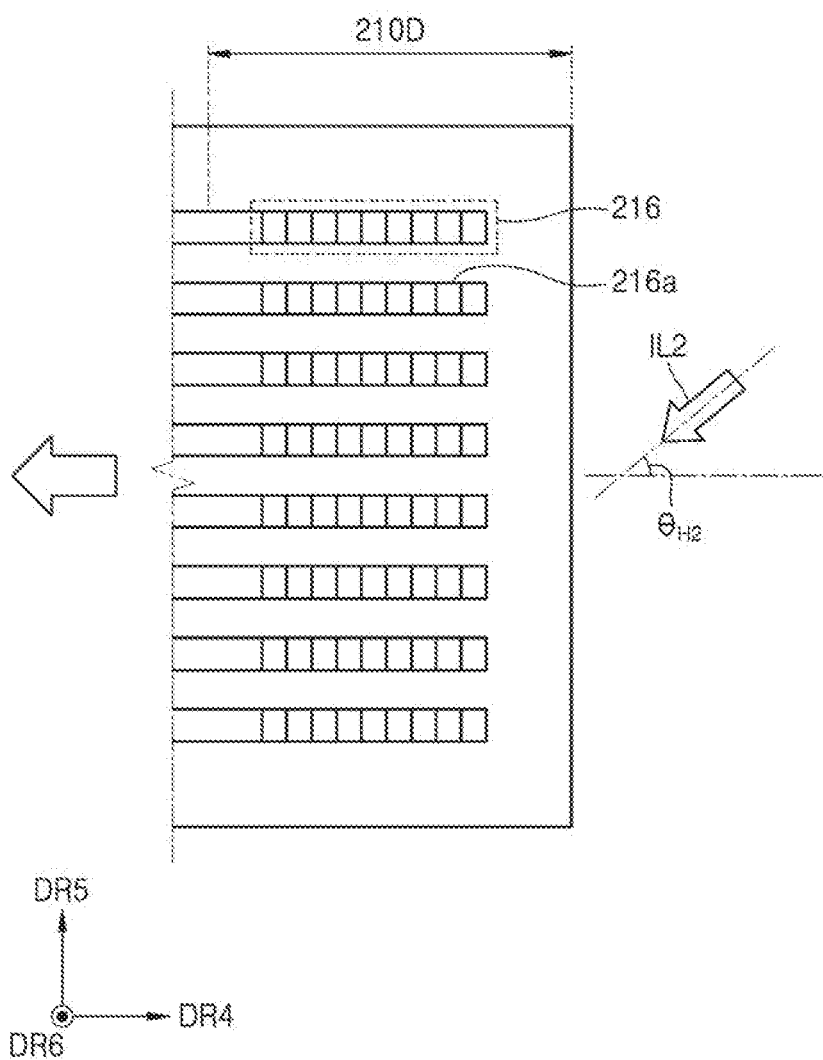
FIG. 8 is a plan view illustrating a first reception area of FIG. 6.
Figure 9:
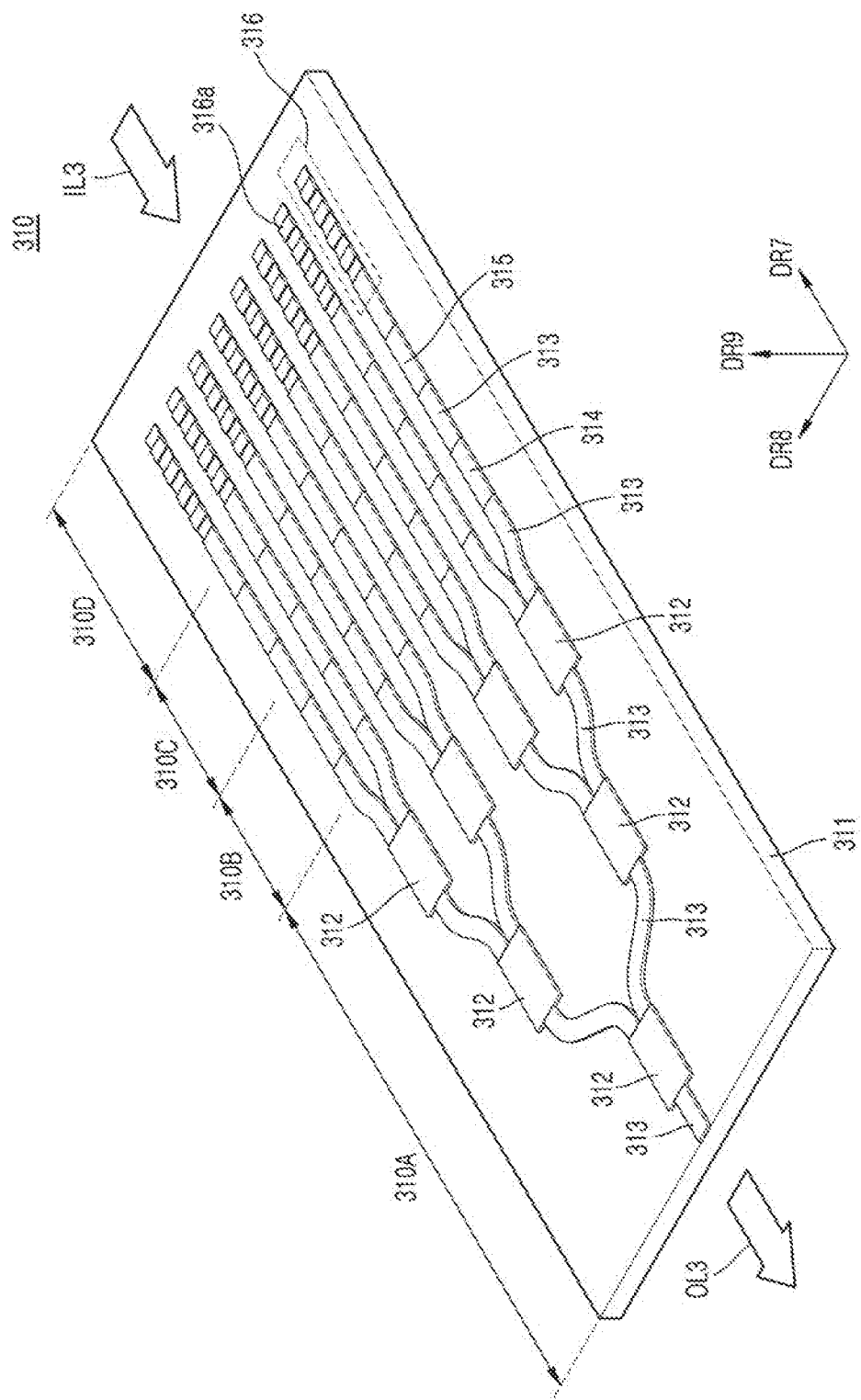
FIG. 9 is a perspective view of a second optical antenna element of FIG. 1.
Figure 10:
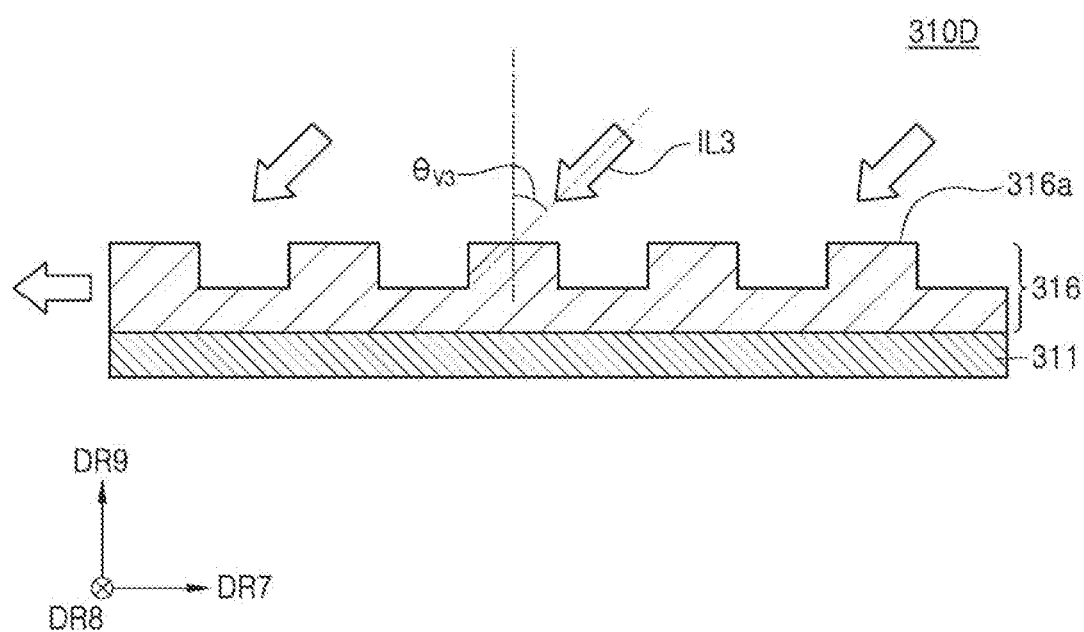
FIG. 10 is a cross-sectional view illustrating a second reception region of FIG. 9.
Figure 11:
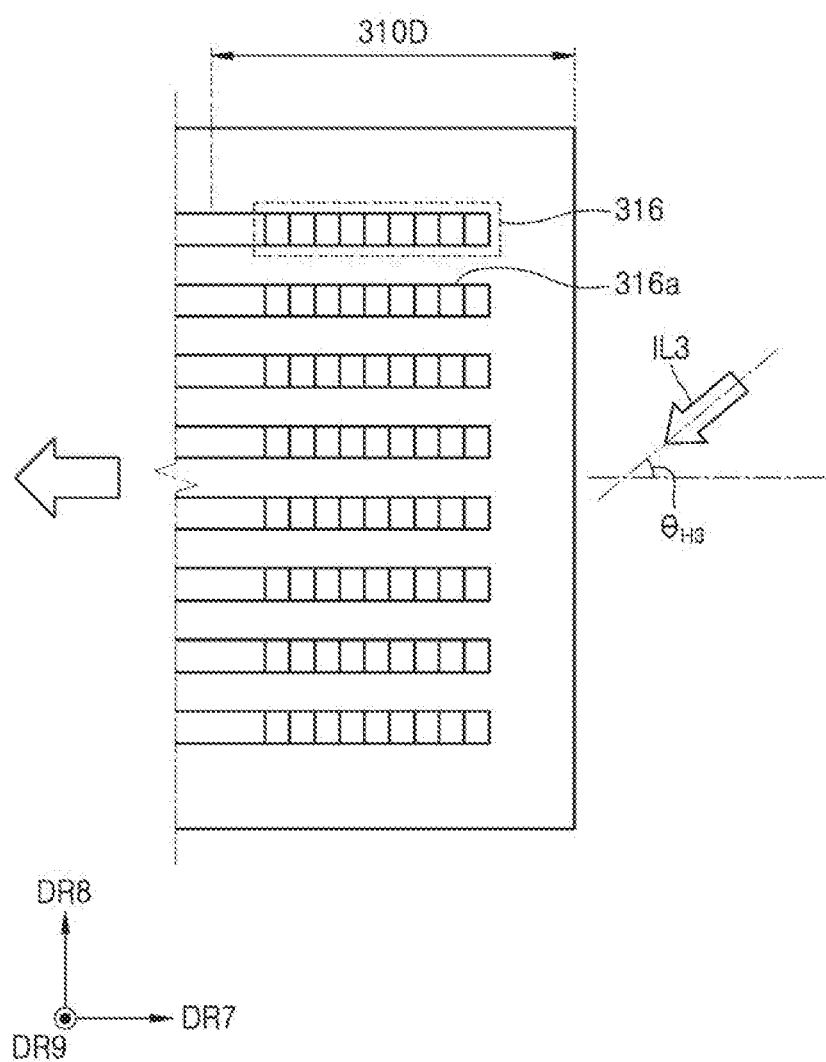
FIG. 11 is a plan view illustrating a second reception region of FIG. 9.

FIG. 1 is a block diagram of a LIDAR device according to example embodiments. FIG. 2 is a perspective view of a beam steering device of FIG. 1. FIG. 3 is a diagram illustrating a first amplification region of FIG. 2. FIG. 4 is a cross-sectional view illustrating an emission region of FIG. 2. FIG. 5 is a plan view illustrating an emission region of FIG. 2. FIG. 6 is a perspective view of a first optical antenna element of FIG. 1. FIG. 7 is a cross-sectional view illustrating a first reception region of FIG. 6. FIG. 8 is a plan view illustrating a first reception region of FIG. 6. FIG. 9 is a perspective view of a second optical antenna element of FIG. 1. FIG. 10 is a cross-sectional view illustrating a second reception region of FIG. 9. FIG. 11 is a plan view illustrating a second reception region of FIG. 9.

Referring to FIG. 1, a LIDAR device 11 including a light emitter 100, a first light detector 200, a second light detector 300, and a processor 1000 may be provided. The light emitter 100 may emit or radiate light to an object. The light emitter 100 may include a light source 110 and a beam steering device 120. The light source 110 may generate light to provide the light to the beam steering device 120. The wavelength of the light may be determined to be suitable for position and/or shape analysis of the object. For example, the light source 110 may include at least one light source of a laser diode (LD) configured to generate and emit light of infrared band wavelength, edge emitting laser, vertical-cavity surface emitting laser (VCSEL), distributed feedback laser, a light emitting diode (LED), and a super luminescent diode (SLD). However, embodiments are not limited thereto. For example, the light source 110 may generate light of a plurality of different wavelength bands. The light source 110 may generate and emit pulsed light or continuous light.

Referring to FIGS. 2 to 5, the beam steering device 120 may receive first input light IL1 provided from the light source 110 and emit first output light OL1. The beam steering device 120 may adjust a traveling direction of the first output light OL1. For example, the beam steering device 120 may adjust the traveling direction of the first output light OL1 such that the first output light OL1 is emitted to the object. The beam steering device 120 may be of a non-mechanical type. For example, the beam steering device 120 may include an optical phased array. However, the beam steering device 120 is not limited to including an optical phased array. In other example embodiments, the beam steering device 120 may include a phased array using an electrically controlled liquid crystal or meta surface, or may include a waveguide array.

The beam steering device 120 may include a branch region 120A, a first phase control region 120B, a first amplification region 120C, and an emission region 120D provided on a substrate 121. The branch region 120A, the first phase control region 120B, the first amplification region 120C, and the emission region 120D may be arranged in the first direction DR1 parallel to the upper surface of the substrate 121. The branch region 120A may include a plurality of optical splitters 122 and optical waveguides 123. The plurality of optical splitters 122 may split one light into pieces of light. For example, a plurality of optical splitters 122 that split one light into two pieces of light are shown in FIG. 2. The first input light IL1 may be split into pieces of light in the branch region 120A. FIG. 2 illustrates an example embodiment in which the first input light IL1 is split into eight pieces of light in the branch region 120A.

The first phase control region 120B may include phase control elements 124 provided on the substrate 121. For example, the phase control elements 124 may be arranged in a second direction DR2 that is parallel to the upper surface of the substrate 121 but different from the first direction DR1. The pieces of light split in the branch region 120A may be provided to the phase control elements 124, respectively. The phase control elements 124 may have a variable refractive index. For example, the refractive indices of the phase control elements 124 may be adjusted by electricity or heat. The phases of the pieces of light passing through the phase control elements 124 may be determined according to the refractive indices of the phase control elements 124. The phase control elements 124 may independently adjust the phases of the split pieces of light. In an example embodiment, the phase control elements 124 may adjust the phases of the split pieces of light such that the split pieces of light have different phases. In an example embodiment, the phase control elements 124 may adjust the phases of the split pieces of light such that the split pieces of light have the same phases.

The first amplification region 120C may include waveguides 123 and amplification elements 125. The waveguides 123 may be provided on the substrate 121. The waveguides 123 may extend from the phase control elements 124 in the first direction DR1, respectively. The amplification elements 125 may be provided on the waveguides 123, respectively. The amplification elements 125 may increase the magnitude of an optical signal. For example, each of the amplification elements 125 may include a semiconductor optical amplifier or an ion doped amplifier. Semiconductor optical amplifiers may not require an excitation laser separately. For example, the semiconductor optical amplifier may include a Fabric-Perot amplifier (FPA)-type optical amplifier and/or a traveling wave amplifier (TWA)-type optical amplifier. In relation to the FPA-type optical amplifier, the injection current causes density inversion in the conduction band, which is a high energy level, such that induced emission occurs by transition to the valence band, which is a low energy level, and may be amplified by the resonator. The TWA-type optical amplifier has anti-reflection coating on both end surfaces of semiconductor laser to suppress reflection at the exit surface and suppress resonance such that the TWA-type optical amplifier may have a structure that widens the gain bandwidth in comparison to the FPA-type optical amplifier.

Referring to FIG. 3, each of the amplification elements 125 may include a lower cladding layer 125$a$, an active layer 125$b$, and an upper cladding layer 125$c$. The lower cladding layer 125$a$, the active layer 125$b$, and the upper cladding layer 125$c$ may include a III-V compound semiconductor material or a II-VI compound semiconductor material. The active layer 125$b$ may include, for example, indium gallium arsenide (InGaAs), indium gallium nitride arsenide (InGaNAs), indium gallium arsenide phosphide (InGaAsP), or indium aluminum gallium arsenide (InAlGaAs). The lower cladding layer 125$a$ and the upper cladding layer 125$c$ may include a semiconductor material having a bandgap larger than that of the active layer 125$b$. The lower cladding layer 125$a$ and the upper cladding layer 125$c$ may include, for example, gallium arsenide (GaAs), gallium phosphide (GaP), aluminum gallium arsenide (AlGaAs), indium gallium phosphide (InGaP), or indium phosphide (InP). The materials of the lower cladding layer 125a, the active layer 125b, and the upper cladding layer 125c may be selected according to the wavelength (energy band gap) of light to be amplified. For example, when amplifying light having a wavelength of 1.55 µm, an InP/InGaAs material may be used for the cladding layer 124a, the active layer 125b, and the upper cladding layer 125c.

The lower conductive layer 125d and the upper conductive layer 125e may be provided on the lower cladding layer 125a and the upper cladding layer 125c, respectively. The lower conductive layer 125d and the upper conductive layer 125e may include a conductive material. For example, the lower conductive layer 125d and the upper conductive layer 125e may include at least one selected from titanium (Ti), gold (Au), silver (Ag), platinum (Pt), copper (Cu), aluminum (Al), nickel (Ni), and/or chromium (Cr). For example, the lower conductive layer 125d and the upper conductive layer 125e may include at least one of indium-tin-oxide (ITO), indium-zinc-oxide (IZO), Ga—In—Zn-oxide (GIZO), Al—Zn-oxide (AZO), Ga—Zn-oxide (GZO), and Zn-oxide (ZnO). In an example embodiment, the lower conductive layer 125d and the upper conductive layer 125e may be electrodes. In an example embodiment, separate electrodes may be coupled to the lower conductive layer 125d and the upper conductive layer 125e.

The emission region 120D may include grating pattern groups 126. The grating pattern groups 126 may be arranged in the second direction DR2. The grating pattern groups 126 may be connected to the amplification elements 125, respectively. For example, each of the grating pattern groups 126 may extend from the amplification elements 125 in the first direction DR1, respectively. The grating pattern groups 126 may emit the pieces of light amplified in the first amplification region 120C, respectively. Each of the grating pattern groups 126 may include grating patterns 126a arranged periodically. The grating patterns 126a may be arranged in the first direction DR1. By a phase difference between the split pieces of light determined in the first phase control region 120B, an interval between the grating patterns 126a, a height of the grating patterns 126a, and a width of the grating patterns 126a, the traveling direction of the first output light OL1 emitted by the grating pattern groups 126 may be determined. Referring to FIG. 4, from the point of view along the second direction DR2, the first output light OL1 may form a first vertical angle $\theta_{V1}$ with a line along the third direction DR3 normal to the upper surface of the substrate 121. In an example embodiment, the first vertical angle $\theta_{V1}$ may be determined according to the wavelength of the light divided in the first phase control region 120B. Referring to FIG. 5, the first output light OL1 may form a first horizontal angle $\theta_{H1}$ with a line along the first direction DR1 from the viewpoint along the third direction DR3. In an example embodiment, the phase difference between the split pieces of light in the first phase control region 120B may be controlled to adjust the first horizontal angle $\theta_{H1}$.

In an example embodiment, the emission region 120D may have an internal structure in which the refractive index difference varies periodically. For example, the traveling direction of the first output light OL1 may be determined by changing the period of the refractive index difference or changing the refractive index.

In an example embodiment, the emission region 120D may have a grating structure for polarization that periodically turns on/off polarization using liquid crystal. For example, the traveling direction of the first output light OL1 may be determined by adjusting at least one of the interval and the transmittance of the grating.

In an example embodiment, the emission region 120D may have the form of a birefringent prism. For example, the traveling direction of the first output light OL1 may be determined by changing the angle of the prism.

In an example embodiment, the emission region 120D may have a structure with an interface between air and liquid such as oil. For example, the traveling direction of the first output light OL1 may be determined by applying a signal from the outside to change the interface or change the refractive index of the liquid.

In an example embodiment, the emission region 120D may include a hologram structure. For example, the traveling direction of the first output light OL1 may be determined by changing the refractive index or the density distribution pattern inside the medium of the hologram structure.

In an example embodiment, the emission region 120D may have a structure in which transmittance is periodically changed according to the intensity of the liquid crystal. For example, the traveling direction of the first output light OL1 may be determined by changing the period or changing the transmittance.

In an example embodiment, the emission region 120D may have a micro-electro-mechanical system (MEMS) mirror array. For example, the traveling direction of the first output light OL1 may be determined by controlling the operating state of each pixel.

In an example embodiment, the emission region 120D may have a medium in which an electric field is formed above, below, left, and right. For example, the traveling direction of the first output light OL1 may be determined by changing the intensity or frequency of the electric field.

In an example embodiment, the emission region 120D may have two or more aligned lens sets. For example, the traveling direction of the first output light OL1 may be determined by moving individual lenses of a lens set up, down, left, and right.

In an example embodiment, the emission region 120D may have two or more aligned micro lens array (MLA) sets. For example, the traveling direction of the first output light OL1 may be determined by moving the individual MLA up, down, left, right and/or by changing the period or shape of the individual MLA.

Referring to FIG. 1, the first light detector 200 may include a first optical antenna element 210 and a first light detection element 220. The first light detector 200 may detect light reflected from an object.

Referring to FIGS. 6, 7, and 8, the first optical antenna element 210 may include an optical phased array. The first optical antenna element 210 may receive the second input light IL2 incident on the first optical antenna element 210. The first optical antenna element 210 may be substantially the same as the beam steering device described with reference to FIGS. 2 and 3. The first optical antenna element 210 may include a first reception region 210D, a second amplification region 210C, a second phase control region 210B, and a first coupling region 210A provided on a substrate 211. The structures of the first reception region 210D, the second amplification region 210C, the second phase control region 210B, and the first coupling region 210A may be substantially identical to the structures of the emission region 120D, the first amplification region 120C, the first phase control region 120B, and the branch region 120A, respectively, described with reference to FIGS. 2 to 4. For conciseness of description, descriptions of structures of the first reception region 210D, the second amplification region 210C, the second phase control region 210B, and the first coupling region 210A may be omitted.

The first reception region 210D may include grating pattern groups 216. The grating pattern groups 216 may be arranged in a fifth direction DR5 parallel to the upper surface of the substrate 211. The grating pattern groups 216 may include grating patterns 216a. The grating patterns 216a may be arranged in the fourth direction DR4 parallel to the upper surface of the substrate 211 and intersecting with the fifth direction DR5. The grating pattern groups 216 and the grating patterns 216a may be substantially the same as the grating pattern groups 126 and the grating patterns 126a described with reference to FIGS. 2 to 4. The grating pattern groups 216 may receive pieces of light by splitting the second input light IL2 incident on the first reception region 210D into the pieces of light. Phases of each of the pieces of light may be determined according to the incident direction of the second input light IL2. In an example embodiment, the pieces of light may have different phases, respectively. In an example embodiment, the pieces of light may have the same phases as each other. Referring to FIG. 7, the second input light IL2 may form a second vertical angle $\theta_{V2}$ with a line along the sixth direction DR6 normal to the upper surface of the substrate 211 from the point of view along the fifth direction DR5. In an example embodiment, the second vertical angle $\theta_{V2}$ may be determined according to the wavelength of the second input light IL2.

The second amplification region 210C may include amplification elements 215 connected to the grating pattern groups 216, respectively. The amplification elements 215 may increase the magnitudes of the optical signals provided from the grating pattern groups 216, respectively. For example, the amplification element 215 may include a semiconductor optical amplifier or an ion doped amplifier.

The second phase control region 210B may modulate the phase of the pieces of light provided from the second amplification region 210C. The second phase control region 210B may include phase control elements 214. The phase control elements 214 may have a variable refractive index. The phases of pieces of light passing through the phase control elements 214 may be determined according to the refractive indices of the phase control elements 214. The phase control elements 214 may independently adjust the phases of the pieces of light. In an example embodiment, the phase control elements 214 may adjust the phases of the pieces of light such that the pieces of light have the same phases. In an example embodiment, the phase control elements 214 may adjust the phases of the pieces of light such that the pieces of light have different phases.

The first coupling region 210A may include a plurality of optical couplers 212 and optical waveguides 213. The plurality of optical couplers 212 may combine the pieces of light into one light. When the pieces of light have the same phases as each other, the pieces of light may be combined into one light in the first coupling region 210A to generate the second output light OL2. When the phases of the pieces of light differ from each other, the first coupling region 210A may not generate output light. Since the phases of the pieces of light are determined according to the incident direction of the second input light IL2, the first optical antenna element 210 may have a first directivity. The first directivity may be variable. The first optical antenna element 210 may receive light incident on the first optical antenna element 210 in the first reception direction set in advance. The first optical antenna element 210 may block light incident on the first optical antenna element 210 in a direction different from the first reception direction. The first optical antenna element 210 may receive light and provide the light to the first light detection element 220. Referring to FIG. 8, from the point of view along the sixth direction DR6, the second input light IL2 may form a second horizontal angle $\theta_{H2}$ with a line along the fourth direction DR1. In an example embodiment, the phase difference between the pieces of light in the second phase control region 210B is controlled such that the second horizontal angle $\theta_{H2}$ may be adjusted.

The first light detection element 220 may convert light provided from the first optical antenna element 210 into an electrical signal. For example, the first light detection element 220 may include at least one of an avalanche photo diode (APD), a single photon avalanche photo diode (SPAPD), a single avalanche photo diode (SAPD), a photo diode (PD), a quantum well photodiode (QWP), and a photo multiplying tube (PMT).

Referring to FIG. 1, the second light detector 300 may include a second optical antenna element 310 and a second light detection element 320. The second light detector 300 may detect light reflected from an object.

Referring to FIGS. 9 to 11, the second optical antenna element 310 may include an optical phased array. The second optical antenna element 310 may receive the third input light IL3 incident on the second optical antenna element 310. The third input light IL3 may be light traveling in a direction different from that of the second input light IL2. The second optical antenna element 310 may be substantially the same as the beam steering device described with reference to FIGS. 2 and 3. The second optical antenna element 310 may include a second reception region 310D, a third amplification region 310C, a third phase control region 310B, and a second coupling region 310A provided on a substrate 311. The structures of the second reception region 310D, the third amplification region 310C, the third phase control region 310B, and the second coupling region 310A may be substantially identical to the structures of the emission region 120D, the first amplification region 120C, the first phase control region 120B, and the branch region 120A, respectively, described with reference to FIGS. 2 to 5. For conciseness of description, descriptions of structures of the second reception region 310D, the third amplification region 310C, the third phase control region 310B, and the second coupling region 310A may be omitted.

The second reception region 310D may include grating pattern groups 316. The grating pattern groups 316 may be arranged in an eighth direction DR8 parallel to the upper surface of the substrate 311. The grating pattern groups 316 may include grating patterns 316a. The grating patterns 316a may be arranged in the seventh direction DR7 parallel to the upper surface of the substrate 311 and intersecting with the eighth direction DR8. The grating pattern groups 316 and the grating patterns 316a may be substantially the same as the grating pattern groups and grating patterns described with reference to FIGS. 2 to 4. The grating pattern groups 316 may receive pieces of light by splitting the third input light IL3 incident on the second reception region 310D into the pieces of light. Phases of the pieces of light may be determined according to the incident direction of the third input light IL3. In an example embodiment, the pieces of light may have different phases, respectively. In an example embodiment, the pieces of light may have the same phases as each other. Referring to FIG. 10, from the point of view along the eighth direction DR8, the third input light IL3 may form a third vertical angle $\theta_{V3}$ with a line along the ninth direction DR9 normal to the upper surface of the substrate 311. The third vertical angle $\theta_{V3}$ may be independent of the second vertical angle $\theta_{V2}$. For example, the third vertical angle $\theta_{V3}$ may be different from the second vertical angle $\theta_{V2}$. In an example embodiment, the third vertical angle $\theta_{V3}$ may be determined according to the wavelength of the third input light IL3.

The third amplification region 310C may include amplification elements 315 connected to the grating pattern groups 316, respectively. The amplification elements 315 may increase the magnitudes of the optical signals provided from the grating pattern groups 316, respectively. For example, the amplification element 315 may include a semiconductor optical amplifier or an ion doped amplifier.

The third phase control region 310B may modulate the phase of the pieces of light provided from the third amplification region 310C. The third phase control region 310B may include phase control elements 314. The phase control elements 314 may have a variable refractive index. The phases of pieces of light passing through the phase control elements 314 may be determined according to the refractive indices of the phase control elements 314. The phase control elements 314 may independently adjust the phases of the pieces of light. In an example embodiment, the phase control elements 314 may adjust the phases of the pieces of light such that the pieces of light have the same phases. In an example embodiment, the phase control elements 314 may adjust the phases of the pieces of light such that the pieces of light have different phases.

The second coupling region 310A may include a plurality of optical couplers 312 and optical waveguides 313. The plurality of optical couplers 312 may combine the pieces of light into one light. When the pieces of light have the same phases as each other, the pieces of light may be combined into one light in the second coupling region 310A to generate the third output light OL3. When the phases of the pieces of light differ from each other, the second coupling region 310A may not generate an output light. Since the phases of the pieces of light are determined according to the incident direction of the third input light IL3, the second optical antenna element 310 may have a second directivity different from the first directivity. The second directivity may be variable. The second optical antenna element 310 may receive light incident on the second optical antenna element 310 in the second reception direction set in advance. The second reception direction may be different from the first reception direction. The second optical antenna element 310 may block light incident on the second optical antenna element in a direction different from the second reception direction. The second optical antenna element 310 may receive the third input light IL3 and provide the third input light IL3 to the second light detection element 320. Referring to FIG. 11, the third input light IL3 may form a third horizontal angle $\theta_{H3}$ with a line along the seventh direction DR7 from the viewpoint along the ninth direction DR9. The third horizontal angle $\theta_{H3}$ and the second horizontal angle $\theta_{H2}$ may be independent of each other. For example, the third horizontal angle $\theta_{H3}$ may be different from the second horizontal angle $\theta_{H2}$. In an example embodiment, the phase difference between the plurality of lights is controlled in the third phase control region 310B, so that the third horizontal angle $\theta_{H3}$ may be adjusted.

The second light detection element 320 may convert light provided from the second optical antenna element 310 into an electrical signal. For example, the second light detection element 320 may include at least one of an APD, an SPAPD, an SAPD, a PD, a QWP, and a PMT.

The processor 1000 may control the light emitter 100. The light source 110 may be controlled by the processor 1000 to generate light and provide the light to the beam steering device 120. The beam steering device 120 may be controlled by the processor 1000 to change the traveling direction of the light.

The processor 1000 may adjust the first directivity of the first optical antenna element 210 and the second directivity of the second optical antenna element 310. For example, the processor 1000 may adjust the first directivity and the second directivity by providing an electrical signal or a thermal signal to the first optical antenna element 210 and the second optical antenna element 310.

The processor 1000 may perform signal processing for obtaining information on the object by using the light detected by the light detector 200. The processor 1000 may determine, for example, a distance to a position of the object based on the angle at which the light is emitted to the object and the time of flight of the light reflected from the object, and perform data processing for analyzing the position and shape of the object.

In a case where a LIDAR device includes one light detector, the light emitter may emit the light and then emit the next light after the effective measurement time elapses. The effective measurement time may be a reference time for determining at least one of a horizontal resolution, a vertical resolution, and a maximum measurement distance of the LiDAR device. In general, the effective measurement time may be longer than the driveable time of the light source in the light emitter that is the time after which the light source may emit the next light. Therefore, the resolution of the image may be limited by the effective measurement time.

The light emitter 100 according to an example embodiment may emit the second light before the effective measurement time elapses after the first light is emitted. When the first light is reflected and returned to the LiDAR device 11, the first light detector 200 may detect the reflected light. Thereafter, when the second light is reflected and returned to the LiDAR device 11, the second light detector 300 may detect the reflected light. The light emitter 100 may emit light at intervals shorter than the effective measurement time. The first light detector 200 and the second light detector 300 may alternately detect the first light and the second light. Accordingly, the image resolution of the LiDAR device 11 may be improved. The image resolution may be at least one of a spatial resolution for a horizontal direction and/or a vertical direction, and a temporal resolution that is an image update rate in unit time.

According to the example embodiment, the LiDAR device 11 including the first light detector 200 and the second light detector 300 has been described. However, embodiments are not limited thereto. For example, the LiDAR device 11 may include three or more light detectors.

Figure 12:
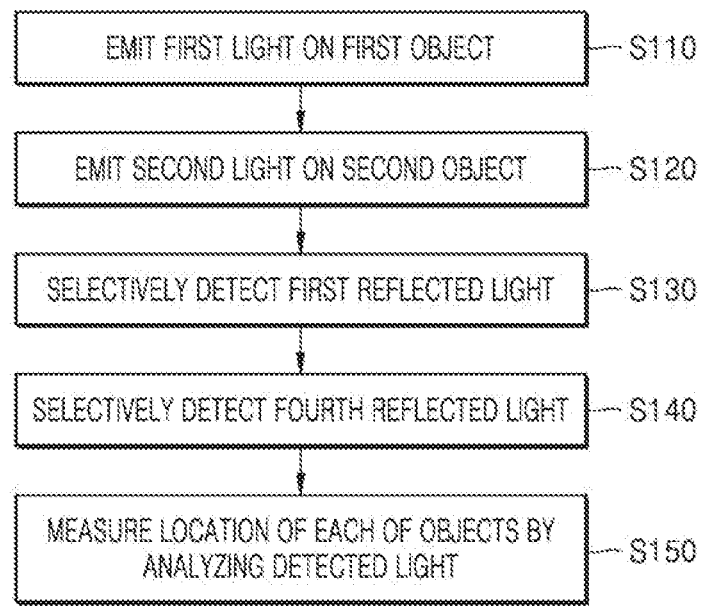
FIG. 12 is a flowchart illustrating a method of driving a LiDAR device, according to example embodiments.
Figure 13:
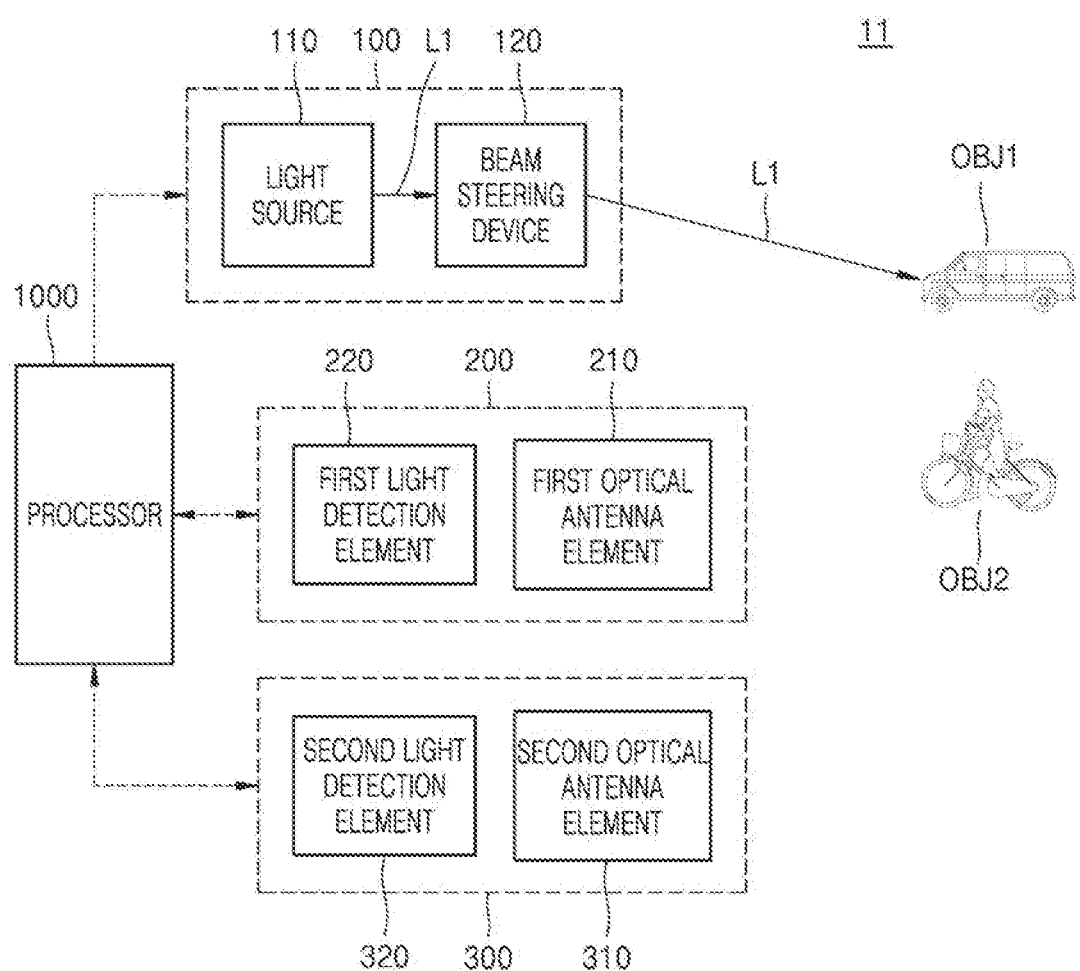
FIG. 13 is a block diagram illustrating a method of driving a LIDAR device of FIG. 12.
Figure 14:
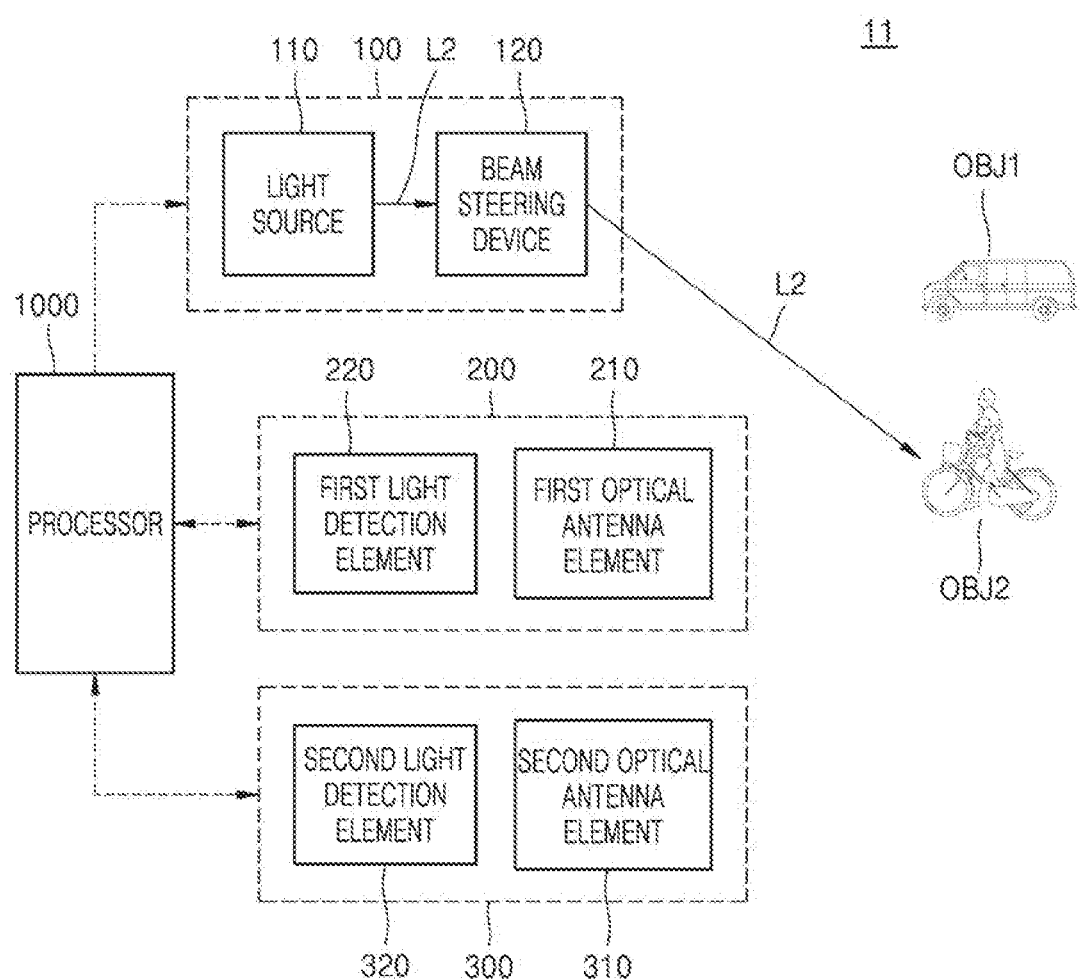
FIG. 14 is a block diagram illustrating a method of driving a LIDAR device of FIG. 12.
Figure 15:
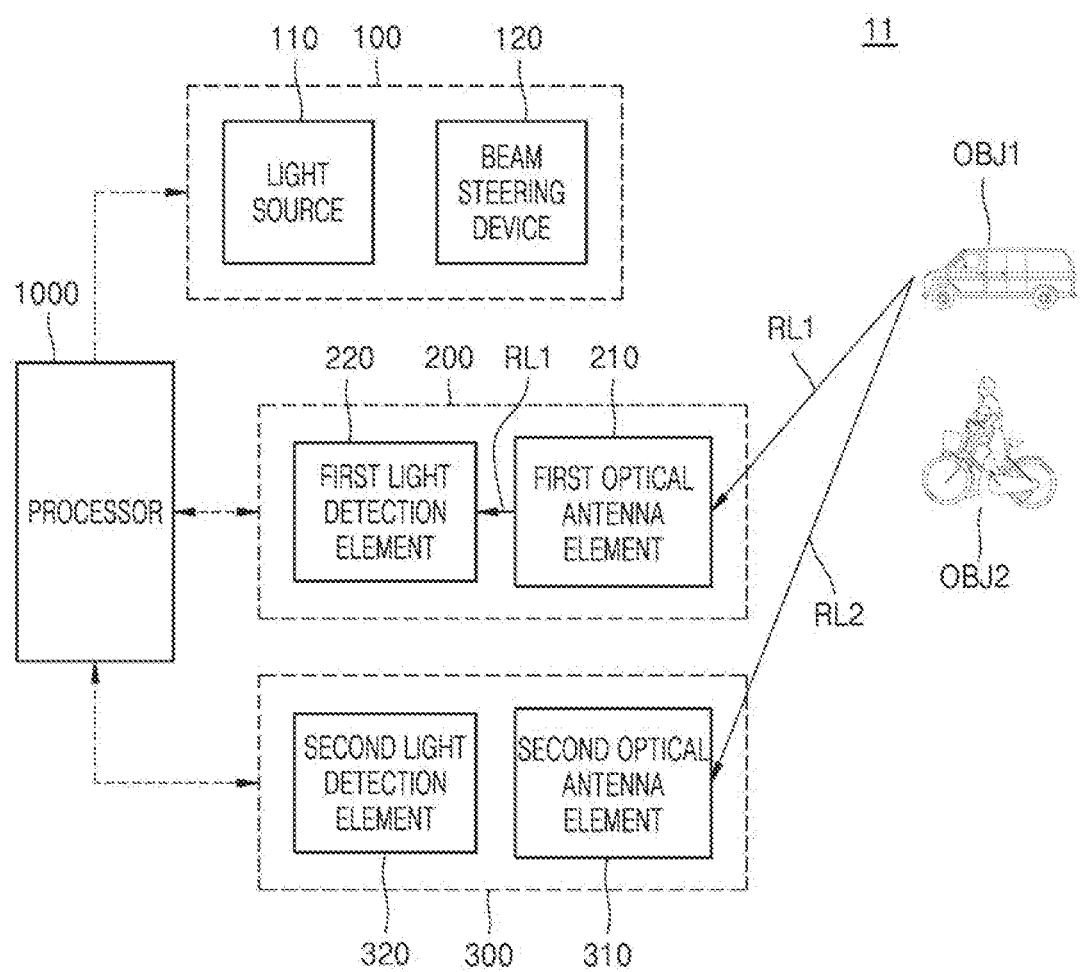
FIG. 15 is a block diagram illustrating a method of driving a LIDAR device of FIG. 12.
Figure 16:
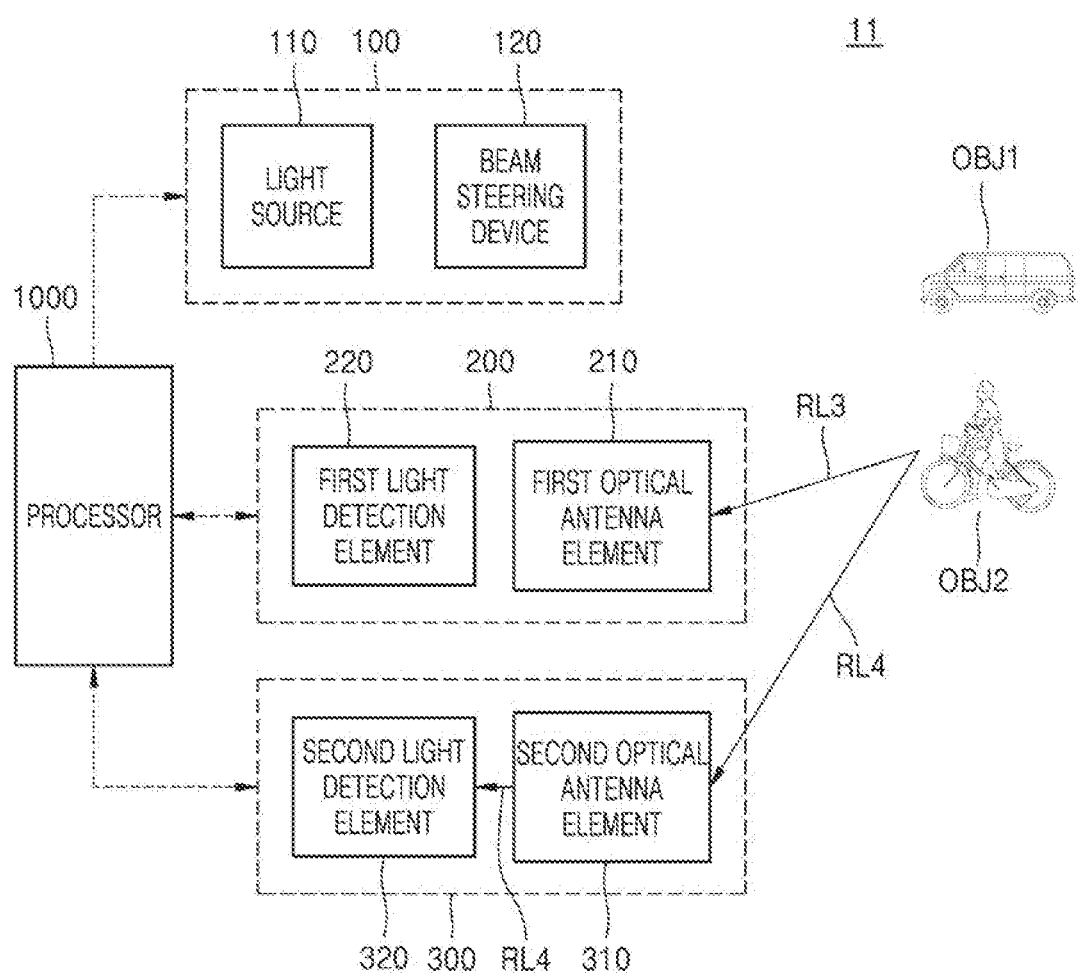
FIG. 16 is a block diagram illustrating a method of driving a LIDAR device of FIG. 12.

FIG. 12 is a flowchart illustrating a method of driving a LIDAR device, according to example embodiments. FIG. 13 is a block diagram illustrating a method of driving a LIDAR device of FIG. 12. FIG. 14 is a block diagram illustrating a method of driving a LiDAR device of FIG. 12. FIG. 15 is a block diagram illustrating a method of driving a LiDAR device of FIG. 12. FIG. 16 is a block diagram illustrating a method of driving a LIDAR device of FIG. 12.

Referring to FIGS. 12 and 13, the first light L1 may be emitted to the first object OBJ1 (S110). The emitting of the first light L1 may include generating the first light L1 and providing the first light L1, by the light source 110, to the beam steering device 120 and adjusting, by the beam steering device 120, the traveling direction of the first light L1 such that the first light L1 is emitted to the first object OBJ1. The light source 110 may be controlled by the processor 1000 to emit the first light L1. For example, the first light L1 may be a light produced by an infrared laser. The beam steering device 120 may be controlled by the processor 1000 to change the traveling direction of the first light L1. For example, the processor 1000 may change a traveling direction of the first light L1 by providing an electrical signal to the beam steering device 120.

Referring to FIGS. 12 and 14, the second light L2 may be emitted to the second object OBJ2 (S120). The emitting of the second light L2 may include generating the second light L2 and providing the second light L2, by the light source 110, to the beam steering device 120 and adjusting, by the beam steering device 120, the traveling direction of the second light L2 such that the second light L2 is emitted to the second object OBJ2. The second light L2 may be emitted before the first light detector 200 detects the light reflected from the first object OBJ1. The second light L2 may be emitted before the effective measurement time elapses from when the first light L1 is emitted. The effective measurement time may be a reference time for determining at least one of a horizontal resolution, a vertical resolution, and a maximum measurement distance of the LiDAR device. The effective measurement time may be set in advance.

In an example embodiment, the second light L2 may be emitted from the light emitter 100 when a predetermined emission time elapses from when the first light L1 is emitted.

In an example embodiment, when the first light detector 200 detects the first reflected light before the predetermined emission time elapses from when the first light L1 is emitted, the second light L2 may be emitted from the light emitter 100 before the predetermined emission time elapses from when the first light L1 is emitted. The first reflected light will be described later. For example, when the first reflected light is detected, the second light L2 may be emitted.

Referring to FIGS. 12 and 15, the first light L1 may be diffusely reflected by the first object OBJ1. The first reflected light RL1 among the pieces of light diffusely reflected by the first object OBJ1 may be incident on the first light detector 200 and the second reflected light RL2 among the diffusely reflected pieces of light may be incident on the second light detector 300. The first optical antenna element 210 in the first light detector 200 may have a first directivity to receive the first reflected light RL1. For example, the first optical antenna element 210 may receive light incident on the first optical antenna element 210 in the same traveling direction as that of the first reflected light RL1 and block light incident on the first optical antenna element 210 in a different traveling direction. The processor 1000 may control the first optical antenna element 210 such that the first optical antenna element 210 has a first directivity with respect to the incident direction of the first reflected light RL1. The first optical antenna element 210 may provide the received first reflected light RL1 to the first light detection element 220. For example, the first light detector 200 may selectively detect the first reflected light RL1 (S130).

The second optical antenna element 310 in the second light detector 300 may not have directivity with respect to the incident direction of the second reflected light RL2. For example, the second reflected light RL2 may not be transmitted by the second optical antenna element 310. The second optical antenna element 310 may not transmit the second reflected light RL2 to the second light detection element 320. The processor 1000 may control the second optical antenna element 310 such that the second optical antenna element 310 does not have directivity with respect to the incident direction of the second reflected light RL2.

Referring to FIGS. 12 and 16, the second light L2 may be diffusely reflected by the second object OBJ2. The third reflected light RL3 among the pieces of light diffusely reflected by the second object OBJ2 may be incident on the first light detector 200, and the fourth reflected light RL4 among the diffusely reflected pieces of light may be incident on the second light detector 300. The second optical antenna element 310 in the second light detector 300 may have a second directivity to receive the fourth reflected light RL4. The processor 1000 may control the second optical antenna element 310 such that the second optical antenna element 310 has a second directivity with respect to the incident direction of the fourth reflected light RL4. The second optical antenna element 310 may provide the received fourth reflected light RL4 to the second light detection element 320. For example, the second light detector 300 may selectively detect the fourth reflected light RL4 (S140).

The first optical antenna element 210 in the first light detector 200 may not have directivity with respect to the incident direction of the third reflected light RL3. For example, the third reflected light RL3 may not be transmitted by the first optical antenna element 210. The first optical antenna element 210 may not transmit the third reflected light RL3 to the first light detection element 220. The processor 1000 may control the first optical antenna element 210 such that the first optical antenna element 210 does not have directivity with respect to the incident direction of the third reflected light RL3.

The first reflected light RL1 and the fourth reflected light RL4 detected by the first light detector 200 and the second light detector 300, respectively, may be analyzed by the processor 1000 (S150). The processor 1000 may measure the directions and distances of the first object OBJ1 and the second object OBJ2 from the first reflected light RL1 and the fourth reflected light RL4. For example, directions of the first object OBJ1 and the second object OBJ2 may be measured using the first directivity and the second directivity of the first optical antenna element 210 and the second optical antenna element 310. For example, the distance between the first light detector 200 and the first object OBJ1 may be measured using a time until the first reflected light RL1 is received after the first light L1 is emitted. For example, the distance between the second light detector 300 and the second object OBJ2 may be measured using a time until the fourth reflected light RL4 is received after the second light L2 is emitted.

The method of driving the LiDAR device of example embodiments may have a greater number of measurements that may be performed within a predetermined time than the method of driving the LiDAR device with one light detector. Accordingly, a method of driving a LIDAR device providing higher image resolution may be provided.

Figure 17:
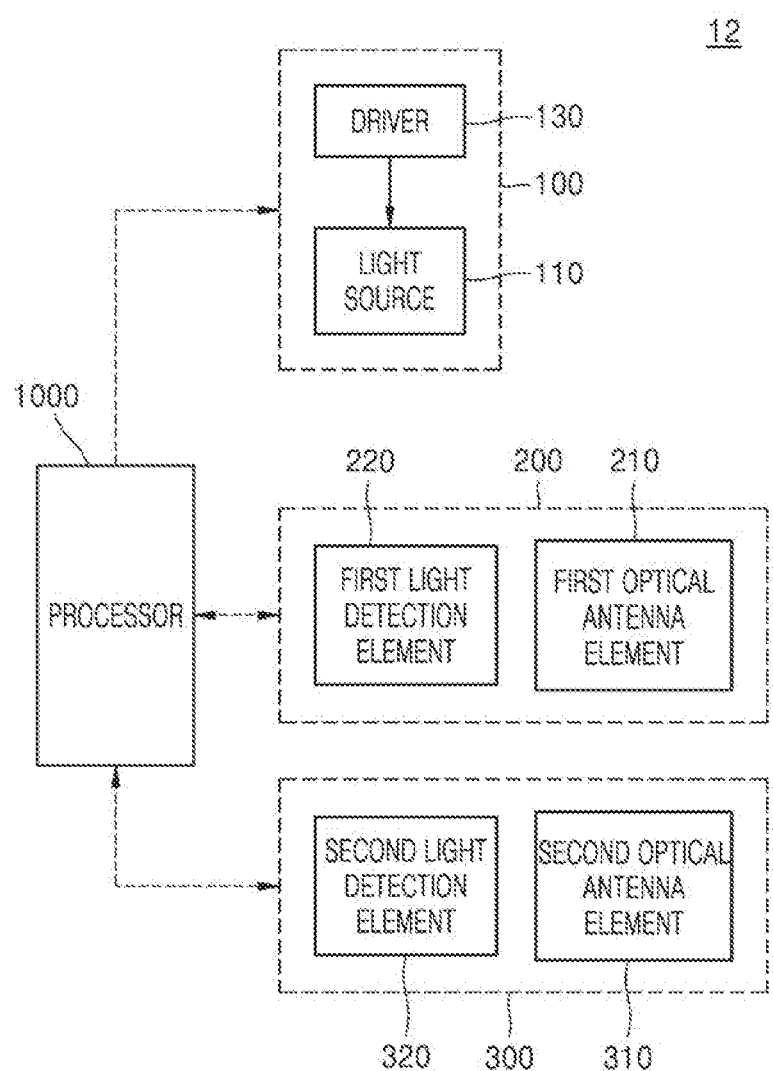
FIG. 17 is a block diagram of a LIDAR device according to example embodiments.

FIG. 17 is a block diagram of a LIDAR device according to example embodiments. For conciseness of description, substantially the same descriptions as given above with reference to FIGS. 1 to 11 may be omitted.

Referring to FIG. 17, a LIDAR device 12 including a light emitter 100, a first light detector 200, a second light detector 300, and a processor 1000 may be provided. The first light detector 200, the second light detector 300, and the processor 1000 may be substantially the same as those described with reference to FIGS. 1 to 8.

The light emitter 100 may include a light source 110 and a driver 130. The light source 110 may be substantially the same as that described with reference to FIG. 1.

The driver 130 may move the light source 110. For example, the driver 130 may rotate the light source 110. The direction in which light is emitted from the light source 110 may be controlled by the driver 130. As shown in FIGS. 13 and 14, when the first light L1 and the second light L2 are sequentially emitted on the first object and the second object, after the light source 110 emits the first light L1, the driver 130 may move the light source 110 such that the second light L2 may be emitted on the second object. The time for the driver 130 to move the light source 110 may be shorter than the effective measurement time.

The light emitter 100 of the example embodiment may emit the second light L2 even before the effective measurement time elapses after the first light L1 is emitted. When the first light L1 is reflected and returned to the LiDAR device 12, the first light detector 200 may detect the first reflected light RL1 in FIG. 15 of the first light L1. When the second light L2 is reflected and returned to the LiDAR device 12, the second light detector 300 may detect the fourth reflected light RL4 in FIG. 16 of the second light L2. The light emitter 100 may emit light at intervals shorter than the effective measurement time. The first light detector 200 and the second light detector 300 may alternately detect the first light and the second light. Accordingly, the image resolution of the LiDAR device 12 may be improved.

Figure 18:
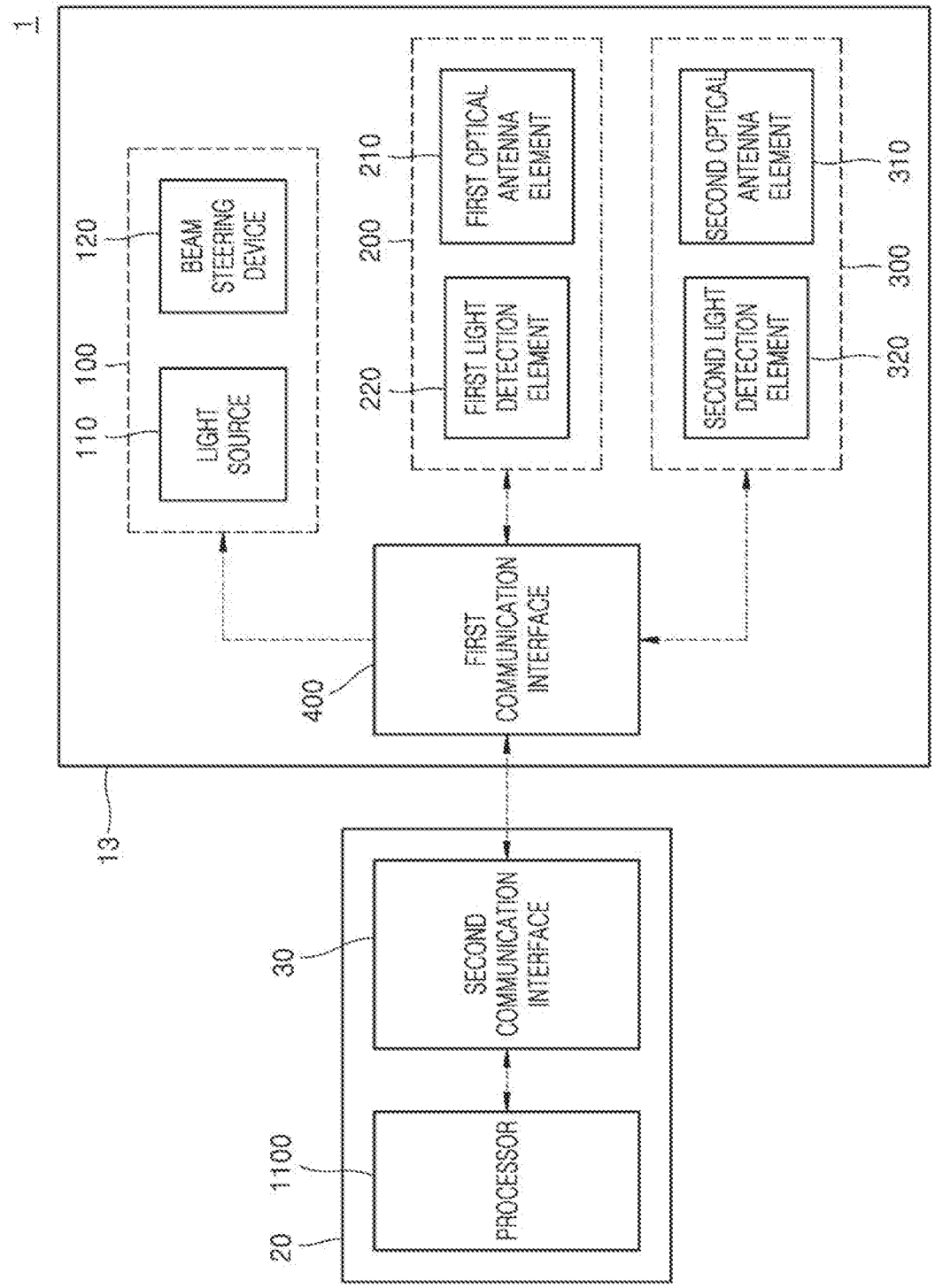
FIG. 18 is a block diagram of a LiDAR system according to example embodiments.

FIG. 18 is a block diagram of a LiDAR system according to example embodiments. For conciseness of description, substantially the same descriptions as given above with reference to FIGS. 1 to 11 may be omitted.

Referring to FIG. 18, a LiDAR system 1 including a LiDAR device 13 and a control device 20 may be provided.

The LiDAR device 13 may include a light emitter 100, a first light detector 200, a second light detector 300, and a first communication interface 400. The light emitter 100, the first light detector 200, and the second light detector 300 may be substantially the same as those described with reference to FIGS. 1 to 11. The control device 20 may include a processor 1100 and a second communication interface 30. For example, when the control device 20 is a vehicle, the processor 1100 and the second communication interface 30 may be embedded in the vehicle.

The first communication unit 400 of the LiDAR device 13 may transmit and receive signals wirelessly with the second communication unit 30 of the control device 20. The first communication interface 400 may receive control signals from the control device 20 and provide the control signals to the light emitter 100, the first light detector 200, and the second light detector 300. The control signals may be signals for controlling the operation of the light emitter 100, the first light detector 200, and the second light detector 300. The first communication interface 400 may receive measurement signals from the first light detector 200 and the second light detector 300 and transmit the measurement signals to the control device 20. The measurement signals may be signals for reflected pieces of light detected by the first light detector 200 and the second light detector 300.

The processor 1100 may generate control signals for controlling the light emitter 100, the first light detector 200, and the second light detector 300. The processor 1100 may provide the control signals to the second communication interface 30. The processor 1100 may receive the measurement signals from the second communication interface 30 and process the measurement signals. The processor 1100 may obtain location information on an object using the measurement signals.

The second communication interface 30 may transmit control signals to the first communication interface 400 of the LiDAR device 13. The second communication interface 30 may receive measurement signals from the first communication interface 400. The second communication interface 30 may provide the measurement signals to the processor 1100.

The example embodiments may provide a LIDAR system 1 having improved image resolution.

Figure 19:
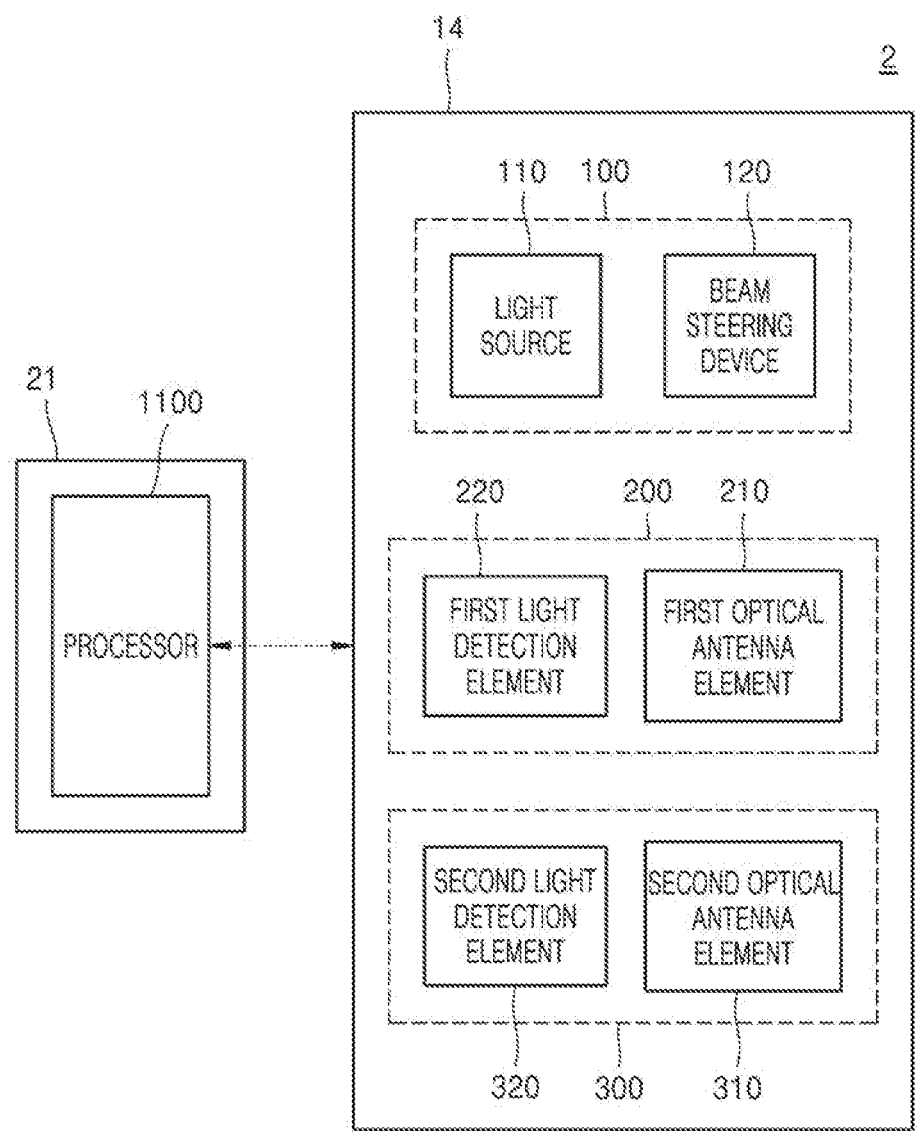
FIG. 19 is a block diagram of a LIDAR system according to example embodiments.

FIG. 19 is a block diagram of a LIDAR system according to example embodiments. For conciseness of description, substantially the same descriptions as given above with reference to FIGS. 1 to 11 and FIG. 18 may be omitted.

Referring to FIG. 19, a LiDAR system 2 including a LIDAR device 14 and a control device 21 may be provided.

The LiDAR device 14 may include a light emitter 100, a first light detector 200, and a second light detector 300. The light emitter 100, the first light detector 200, and the second light detector 300 may be substantially the same as those described with reference to FIGS. 1 to 11.

Unlike the LiDAR device and the control device described with reference to FIG. 18, the LiDAR device 14 and the control device 21 may be connected to each other by wire. The LiDAR device 14 and the control device 21 may not transmit or receive signals through communication interfaces. For example, the light emitter 100, the first light detector 200, and the second light detector 300 of the LiDAR device 14 may be directly connected by wire to the processor 1100 in the control device 21. The first light detector 200 and the second light detector 300 may provide the measurement signals directly to the processor 1100.

When the control device 21 is a vehicle, the processor 1100 may be embedded in the vehicle. The processor 1100 may generate control signals for controlling the light emitter 100, the first light detector 200, and the second light detector 300. The processor 1100 may directly provide the control signals to the light emitter 100, the first light detector 200, and the second light detector 300. The processor 1100 may receive measurement signals and process the measurement signals. The processor 1100 may obtain location information on an object using the measurement signals.

The example embodiments may provide a LIDAR system 2 having improved image resolution.

Figure 20:
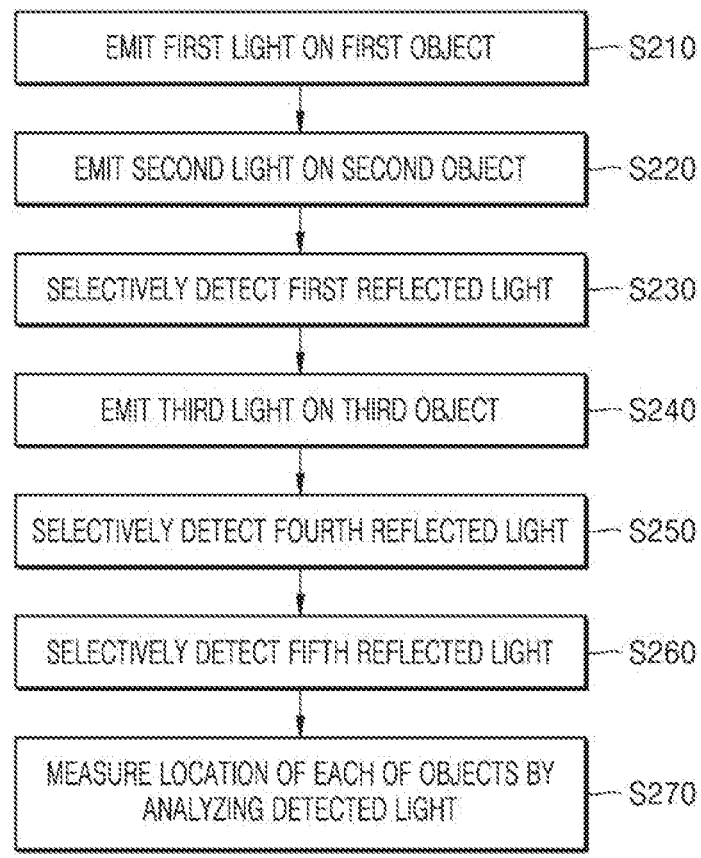
FIG. 20 is a flowchart illustrating a method of driving a LiDAR device, according to example embodiments.
Figure 21:
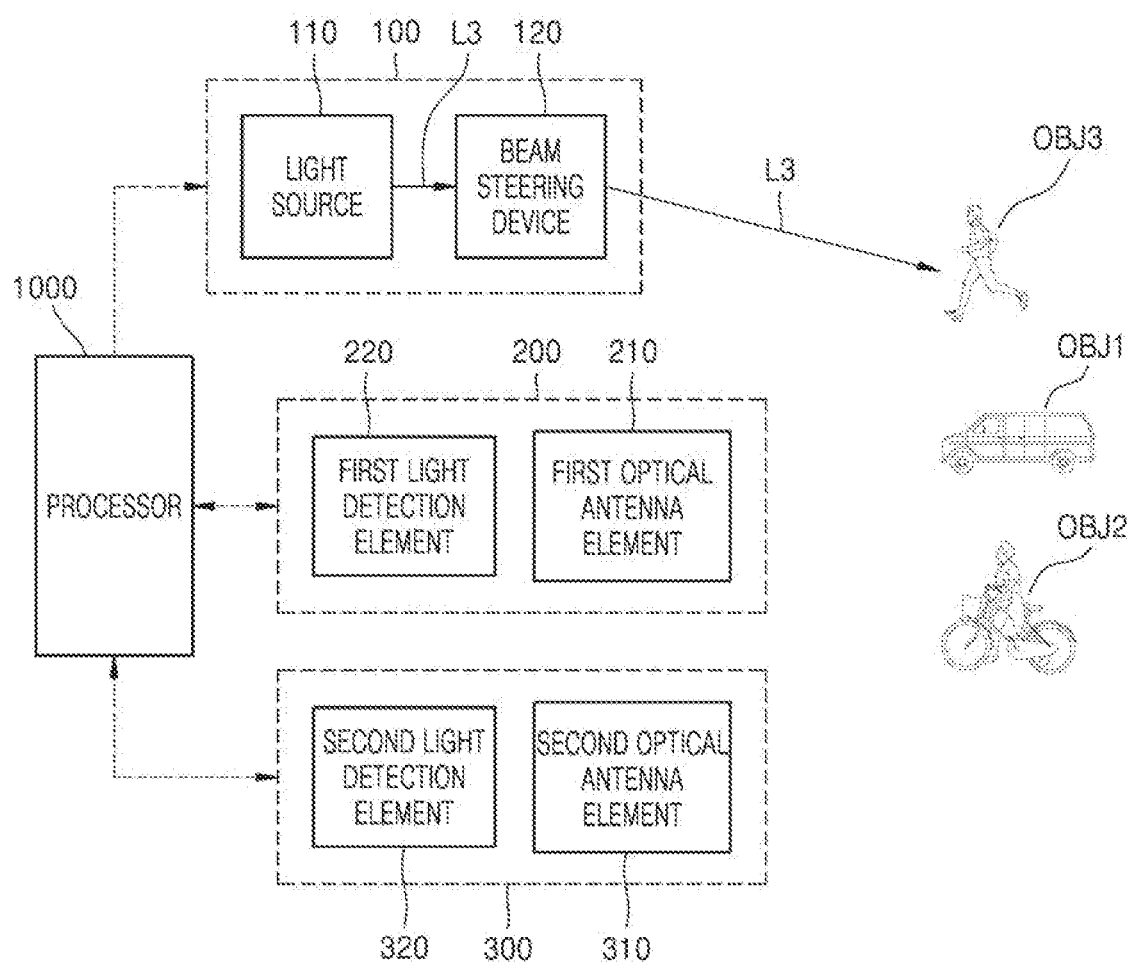
FIG. 21 is a block diagram illustrating a method of driving a LIDAR device of FIG. 20.
Figure 22:
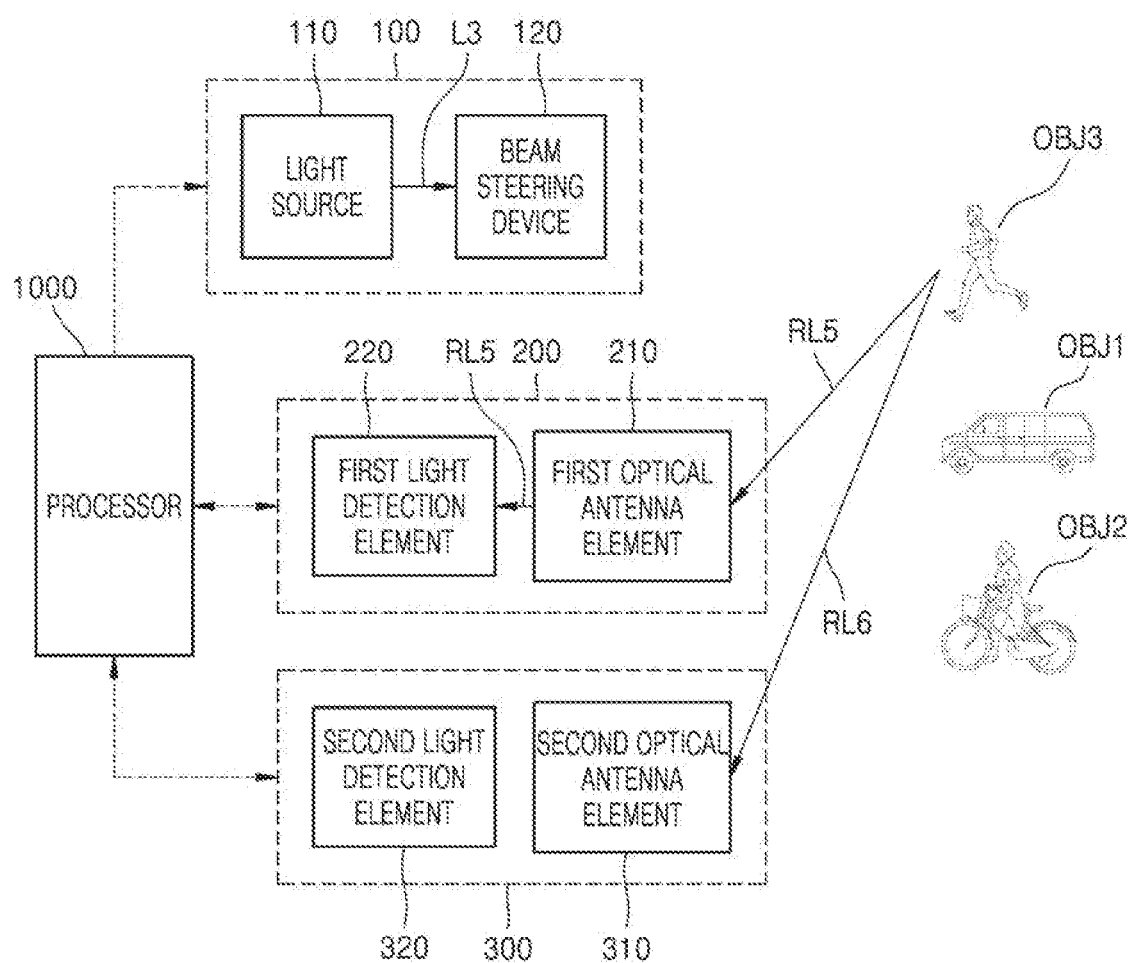
FIG. 22 is a block diagram illustrating a method of driving a LiDAR device of FIG. 20.

FIG. 20 is a flowchart illustrating a method of driving a LiDAR device, according to example embodiments. FIG. 21 is a block diagram illustrating a method of driving a LIDAR device of FIG. 20. FIG. 22 is a block diagram illustrating a method of driving a LIDAR device of FIG. 20. For conciseness of description, descriptions substantially identical to the descriptions given above with reference to FIGS. 12 to 16 are omitted.

Referring to FIGS. 20 and 21, first light and second light may be sequentially emitted to the first object OBJ1 and the second object OBJ2, respectively, (S210 and S220). The emitting of the first light and the second light may be substantially the same as the emitting of the first light (S110) and the emitting of the second light (S120) described with reference to FIGS. 12 to 16. As described with reference to FIG. 12, the first light detector 200 may selectively detect the first reflected light (S230). The first light detector 200 may have directivity with respect to the first reflected light. The first light detector 200 may not detect light traveling in a direction different from the traveling direction of the first reflected light.

The third light L3 may be emitted to the third object OBJ3 (S240). The emitting of the third light L3 may include generating the third light L3 and providing the third light L3, by the light source 110, to the beam steering device 120 and adjusting, by the beam steering device 120, the traveling direction of the third light L3 such that the third light L3 is emitted to the third object OBJ3. After the second light detector 300 detects the light reflected from the first object OBJ1, the third light L3 may be emitted from the light emitter 100. For example, the third light L3 may be emitted after the effective measurement time elapses from when the first light is emitted. Before the second light detector 300 detects the fourth reflected light RL4 shown in FIG. 16 reflected from the second object OBJ2, the third light L3 may be emitted from the light emitter 100. For example, the third light L3 may be emitted before the effective measurement time elapses from when the second light L2 is emitted.

As described with reference to FIG. 16, the second light detector 300 may selectively detect the fourth reflected light RL4 (S250). The second light detector 300 may have directivity with respect to the fourth reflected light RL4. The second light detector 300 may not detect light traveling in a direction different from the traveling direction of the fourth reflected light RL4.

Referring to FIGS. 20 and 22, the first light detector 200 may selectively detect the fifth reflected light RL5 (S260). The third light L3 may be diffusely reflected by the third object OBJ3. The fifth reflected light RL5 among the pieces of light diffusely reflected by the third object OBJ3 may be incident on the first light detector 200, and the sixth reflected light RL6 among the diffusely reflected pieces of light may be incident on the second light detector 300.

The first optical antenna element 210 may have a variable first directivity. The first directivity of the first optical antenna element 210 may be controlled by the processor 1000 such that the first optical antenna element 210 may receive the fifth reflected light RL5. For example, the first optical antenna element 210 may receive light incident on the first optical antenna element 210 in the same traveling direction as that of the fifth reflected light RL5 and block light incident on the first optical antenna element 210 in a different traveling direction. The first optical antenna element 210 may provide the received fifth reflected light RL5 to the first light detection element 220.

The sixth reflected light RL6 reflected by the third object OBJ3 may not be received by the second optical antenna element 310. The second light detector 300 may not have directivity with respect to the incident direction of the sixth reflected light RL6. For example, the sixth reflected light RL6 may not be transmitted by the second optical antenna element 310. The second optical antenna element 310 may not transmit the sixth reflected light RL6 to the second light detection element 320. The processor 1000 may control the second optical antenna element 310 such that the second optical antenna element 310 does not have directivity with respect to the incident direction of the sixth reflected light RL6.

The first reflected light RL1, the fourth reflected light RL4, and the fifth reflected light RL5 detected by the first light detector 200 and the second light detector 300, respectively, may be analyzed by the processor 1000 (S270). The processor 1000 may measure directions and distances of the first object OBJ1, the second object OBJ2, and the third object OBJ3 from the first reflected light RL1, the fourth reflected light RL4, and the fifth reflected light RL5.

The method of driving the LiDAR device according to an example embodiment may have a greater number of measurements that may be performed within a predetermined time than the method of driving the LiDAR device with one light detector. Accordingly, a method of driving a LIDAR device providing higher image resolution may be provided.

Example embodiments may provide a LIDAR device and a LIDAR system having improved image resolution. The image resolution may be at least one of a spatial resolution for a horizontal direction and/or a vertical direction and a temporal resolution that is an image update rate in unit time.

However, the effects are not be limited to the above disclosure.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) device comprising:
    a light emitter configured to emit light;
    a first light detector; and
    a second light detector,
    wherein the first light detector comprises:
        a first optical antenna element having a first directivity with respect to a first direction; and
        a first light detection element configured to detect first reflected light received by the first optical antenna element,
    wherein the second light detector comprises:
        a second optical antenna element having a second directivity with respect to a second direction different from the first direction; and
        a second light detection element configured to detect second reflected light received by the second optical antenna element,
    wherein the light emitter is configured to emit first light and second light to a first object and a second object, respectively,
    wherein the second light is emitted from the light emitter before an effective measurement time elapses from when the first light is emitted from the light emitter,
    wherein the first reflected light is light incident on the first optical antenna element among reflected pieces of light emitted as the first light that is reflected by the first object in the first direction,
    wherein the second reflected light is light incident on the second optical antenna element among reflected pieces of light emitted as the second light that is reflected by the second object in the second direction, and
    wherein the effective measurement time is a time for determining at least one of a horizontal resolution and a vertical resolution of the LiDAR device.

2. The LiDAR device of claim 1, wherein the first optical antenna element is configured to block third reflected light incident on the first optical antenna element among reflected pieces of light emitted as the second light that is reflected by the second object in a direction that is different from the first direction from being transmitted to the first light detection element, and
    wherein the second optical antenna element is configured to block fourth reflected light incident on the second optical antenna element among reflected pieces of light emitted as the first light that is reflected by the first object in a direction that is different from the second direction from being transmitted to the second light detection element.

3. The LiDAR device of claim 1, wherein each of the first optical antenna element and the second optical antenna element comprises an optical phased array element.

4. The LiDAR device of claim 1, wherein the first directivity and the second directivity are controlled based on an electrical signal or a thermal signal.

5. The LiDAR device of claim 1, wherein the light emitter comprises:
a light source; and
a beam steering device,
wherein the light source is configured to emit light to the beam steering device, and
wherein the beam steering device is configured to change a traveling direction of the light.

6. The LiDAR device of claim 5, wherein the beam steering device comprises an optical phased array element.

7. The LiDAR device of claim 1, wherein the light emitter comprises:
a light source configured to emit light; and
a driver configured to move the light source and control a direction in which the light source emits the light.

8. A light detection and ranging (LiDAR) device comprising:
a light emitter configured to emit light;
a first light detector;
a second light detector; and
a processor configured to control the light emitter, the first light detector, and the second light detector,
wherein the processor is further configured to control the first light detector to selectively detect first reflected light incident on the first light detector in a first direction, and control the second light detector to selectively detect second reflected light incident on the second light detector in a second direction that is different from the first direction,
wherein the processor is further configured to control the light emitter such that the light emitter emits first light and second light to a first object and a second object, respectively, and such that the second light is emitted from the light emitter before an effective measurement time elapses from when the first light is emitted from the light emitter, and
wherein the effective measurement time is a time for determining at least one of a horizontal resolution and a vertical resolution of the LiDAR device.

9. The LiDAR device of claim 8, wherein the first light detector comprises a first optical antenna element and a first light detection element,
wherein the first optical antenna element is configured to receive the first reflected light and transmit the first reflected light to the first light detection element,
wherein the first light detection element is configured to detect the first reflected light,
wherein the second light detector comprises a second optical antenna element and a second light detection element,
wherein the second optical antenna element is configured to receive the second reflected light and transmit the second reflected light to the second light detection element, and
wherein the second light detection element is configured to detect the second reflected light.

10. The LiDAR device of claim 9, wherein the first optical antenna element comprises:
a plurality of grating groups configured to split the first reflected light into pieces of light and receive the pieces of light formed by splitting the first reflected light;
a plurality of phase control elements configured to independently control phases of the pieces of light formed by splitting the first reflected light, respectively; and
a plurality of optical couplers configured to combine the phase-controlled pieces of light into one light,
wherein the second optical antenna element comprises:
a plurality of grating groups configured to split the second reflected light into pieces of light and receive the pieces of light formed by splitting the second reflected light;
a plurality of phase control elements configured to independently control phases of the pieces of light formed by splitting the second reflected light, respectively; and
a plurality of optical couplers configured to combine the phase-controlled pieces of light into one light.

11. The LiDAR device of claim 10, wherein the processor is further configured to control the plurality of phase control elements of the first optical antenna element such that the pieces of light formed by splitting the first reflected light have same phases as each other, and control the plurality of phase control elements of the second optical antenna element such that the pieces of light formed by splitting the second reflected light have same phases as each other.

12. The LiDAR device of claim 10, wherein the processor is further configured to control the first optical antenna element such that the first optical antenna element blocks third reflected light incident on the first optical antenna element among the reflected pieces of light emitted as the second light that is reflected by the second object from being transmitted to the first light detection element, and control the second optical antenna element such that the second optical antenna element blocks fourth reflected light incident on the second optical antenna element among the reflected pieces of light emitted as the first light that is reflected by the first object from being transmitted to the second light detection element.

13. The LiDAR device of claim 12, wherein the plurality of grating groups of the first optical antenna element is configured to split the third reflected light into pieces of light and receive the pieces of light formed by splitting the third reflected light, and
wherein the plurality of grating groups of the second optical antenna element is configured to split the fourth reflected light into pieces of light and receive the pieces of light formed by splitting the fourth reflected light,
wherein the processor is further configured to control a plurality of phase control elements of the first optical antenna element such that the pieces of light formed by splitting the third reflected light have different phases, respectively, and control a plurality of phase control elements of the second optical antenna element such that the pieces of light formed by splitting the fourth reflected light have different phases, respectively.

14. The LiDAR device of claim 8, wherein the processor is further configured to control the light emitter to emit third light on a third object when the effective measurement time elapses from when the first light is emitted, and control the first light detector such that the first light detector selectively detects third reflected light reflected by the third object.

15. The LiDAR device of claim 8, wherein after the first light is emitted, based on the first light detector not detecting the first reflected light before a predetermined emission time elapses, the processor is further configured to control the light emitter to emit the second light when the predetermined emission time elapses from when the first light is emitted.

16. The LiDAR device of claim 15, wherein after the first light is emitted, based on the first light detector detecting the first reflected light before the predetermined emission time elapses, the processor is further configured to control the light emitter to emit the second light before the predetermined emission time elapses from when the first light is emitted.

17. The LiDAR device of claim 16, wherein after the first light is emitted, based on the first light detector detecting the first reflected light before the predetermined emission time elapses, the processor is further configured to control the light emitter to emit the second light when the first reflected light is detected.

18. The LiDAR device of claim 16, wherein the processor is further configured to control the light emitter such that the light emitter emits third light on a third object between a first point in time at which the effective measurement time elapses from when the first light is emitted and a second point in time at which the second light is emitted,
wherein the processor is further configured to control the first light detector such that the first light detector selectively detects fifth reflected light reflected by the third object.

19. A light detection and ranging (LiDAR) system comprising:
a LiDAR device; and
at least one processor configured to control the LiDAR device,
wherein the LiDAR device comprises a light emitter, a first light detector, a second light detector, and a first communication interface,
wherein the first light detector comprises a first optical antenna element having a first directivity with respect to a first direction, and a first light detection element configured to detect first reflected light received by the first optical antenna element,
wherein the second light detector comprises a second optical antenna element having a second directivity with respect to a second direction that is different from the first direction, and a second light detection element configured to detect second reflected light received by the second optical antenna element,
wherein the at least one processor is configured to control the light emitter, the first light detector, and the second light detector, and a second communication interface connected to the first communication interface,
wherein the light emitter is configured to emit first light and second light on a first object and a second object, respectively,
wherein the second light is emitted from the light emitter before an effective measurement time elapses from when the first light is emitted from the light emitter,
wherein the first reflected light is light incident on the first optical antenna element among reflected pieces of light emitted as the first light that is reflected by the first object in the first direction,
wherein the second reflected light is light incident on the second optical antenna element among reflected pieces of light emitted as the second light that is reflected by the second object in the second direction, and
wherein the effective measurement time is a time for determining at least one of a horizontal resolution and a vertical resolution of the LiDAR device.

20. The LiDAR system of claim 19, wherein the at least one processor is configured to generate control signals to control the light emitter, the first light detector, and the second light detector,
wherein the second communication interface is configured to transmit the control signals to the first communication interface, and
wherein the first communication interface is configured to transmit the control signals to the light emitter, the first light detector, and the second light detector.

21. The LiDAR system of claim 20, wherein the first light detection element is configured to generate a first detection signal for the first reflected light, and the second light detection element is configured to generate a second detection signal for the second reflected light,
wherein the first communication interface is configured to transmit the first detection signal and the second detection signal to the second communication interface,
wherein the second communication interface is configured to transmit the first detection signal and the second detection signal to the at least one processor.

22. The LiDAR system of claim 19, wherein the first optical antenna element is configured to block third reflected light incident on the first optical antenna element among reflected pieces of light emitted as the second light that is reflected by the second object in a direction that is different from the first direction from being transmitted to the first light detection element, and
wherein the second optical antenna element is configured to block fourth reflected light incident on the second optical antenna element among reflected pieces of light emitted as the first light that is reflected by the first object in a direction that is different from the second direction from being provided to the second light detection element.

23. The LiDAR system of claim 19, wherein each of the first optical antenna element and the second optical antenna element comprises an optical phased array element.

24. The LiDAR system of claim 19, wherein the first directivity and the second directivity are controlled by an electrical signal or a thermal signal.

25. The LiDAR system of claim 19, wherein the light emitter comprises:
a light source; and
a beam steering device,
wherein the light source is configured to emit light to the beam steering device, and
wherein the beam steering device is configured to change a traveling direction of the light.

26. The LiDAR system of claim 25, wherein the beam steering device comprises an optical phased array element.

27. The LiDAR system of claim 19, wherein the light emitter comprises:
a light source configured to emit light; and
a driver configured to move the light source and control a direction in which the light source emits the light.

28. A light detection and ranging (LiDAR) device comprising:
a light emitter configured to emit light;
a first light detector comprising a first optical antenna element and a first light detection element, the first light detector being configured to selectively detect first reflected light incident on the first light detector in a first direction; and
a second light detector comprising a second optical antenna element and a second light detection element, the second light detector being configured to selectively detect second reflected light incident on the second light detector in a second direction that is different from the first direction, wherein the first optical antenna element and the second optical antenna element respectively comprises an optical phased array, wherein the light emitter is configured to emit first light and second light on a first object and a second object, respectively, wherein the second light is emitted from the light emitter before an effective measurement time elapses from when the first light is emitted from the light emitter, wherein the first reflected light is light incident on the first optical antenna element among reflected pieces of light emitted as the first light that is reflected by the first object in the first direction, wherein the second reflected light is light incident on the second optical antenna element among reflected pieces of light emitted as the second light that is reflected by the second object in the second direction, and wherein the effective measurement time is a time for determining at least one of a horizontal resolution and a vertical resolution of the LiDAR device.

29. The LiDAR device of claim 28, wherein the first optical antenna element is configured to transmit the first light incident on the first light detector in the first direction to the first light detection element, and block light incident on the first light detector in a direction that is different from the first direction, and wherein the second optical antenna element is configured to transmit the second light incident on the second light detector in the second direction to the second light detection element and block light incident on the second light detector in a direction that is different from the second direction.

\* \* \* \* \*